(12) United States Patent
Kim et al.

(10) Patent No.: US 12,439,268 B2
(45) Date of Patent: *Oct. 7, 2025

(54) METHOD OF OPERATING SPECTRUM SHARING SYSTEM INTEROPERATING WITH DISTRIBUTED ANTENNA SYSTEM

(71) Applicant: SOLiD, INC., Seongnam-si (KR)

(72) Inventors: Ok Jin Kim, Seongnam-si (KR); Dae Young Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 92 days.

This patent is subject to a terminal disclaimer.

(21) Appl. No.: 18/341,103

(22) Filed: Jun. 26, 2023

(65) Prior Publication Data

US 2023/0331367 A1 Oct. 19, 2023

Related U.S. Application Data

(63) Continuation of application No. 16/421,939, filed on May 24, 2019, now Pat. No. 11,729,626.

(30) Foreign Application Priority Data

Dec. 12, 2018 (KR) .......................... 10-2018-0160328
Feb. 28, 2019 (KR) .......................... 10-2019-0024415

(51) Int. Cl.
*H04W 16/14* (2009.01)
*H04W 4/02* (2018.01)
(Continued)

(52) U.S. Cl.
CPC .......... *H04W 16/14* (2013.01); *H04W 4/025* (2013.01); *H04W 72/51* (2023.01); *H04W 76/11* (2018.02); *H04W 76/15* (2018.02)

(58) Field of Classification Search
CPC ..... H04W 16/14; H04W 4/025; H04W 72/51; H04W 76/11; H04W 76/15; H04W 88/085; H04W 88/182
See application file for complete search history.

(56) References Cited

U.S. PATENT DOCUMENTS

2011/0070912 A1* 3/2011 Kang .................... H04W 16/14
455/509
2011/0317780 A1* 12/2011 Kang .................... H04L 5/0053
375/259

(Continued)

FOREIGN PATENT DOCUMENTS

AU 2017262114 A1 11/2018
EP 3 343 971 A1 7/2018

OTHER PUBLICATIONS

Atis: "Neutral Host Solutions for Multi-Operator Wireless Coverage in Managed Spaces", Alliance for Telecommunications Industry Solutions, ATIS-I-0000052, Oct. 11, 2016 (Oct. 11, 2016), pp. 1-17 (total 22 pages).

(Continued)

*Primary Examiner* — Kan Yuen
(74) *Attorney, Agent, or Firm* — Sughrue Mion, PLLC

(57) ABSTRACT

The present disclosure provides a method of allocating shared radio resources in a spectrum shared system (SSS), the method including: obtaining, by a system controller of the SSS, identification information from at least one radio service device of the SSS and a node unit of a distributed antenna system (DAS); determining, by the system controller of the SSS, whether the at least one radio service device interoperates with the DAS based on the identification information; and allocating, by the system controller of the SSS, the shared radio resources to the at least one radio (Continued)

service device and the DAS, respectively, based on a result of the determining of interoperating.

7 Claims, 15 Drawing Sheets

(51) Int. Cl.
  *H04W 72/51* (2023.01)
  *H04W 76/11* (2018.01)
  *H04W 76/15* (2018.01)

(56) References Cited

U.S. PATENT DOCUMENTS

| | | | |
|---|---|---|---|
| 2016/0270089 A1* | 9/2016 | Olfat | H04W 72/21 |
| 2016/0330676 A1 | 11/2016 | Thangarasa et al. | |
| 2017/0064642 A1 | 3/2017 | Tarlazzi et al. | |
| 2017/0208454 A1 | 7/2017 | Knisely et al. | |
| 2017/0215103 A1* | 7/2017 | Liu | H04W 24/02 |
| 2017/0238136 A1 | 8/2017 | Smith | |
| 2017/0339660 A1 | 11/2017 | Kazmi et al. | |
| 2018/0288621 A1 | 10/2018 | Markwart | |
| 2019/0223025 A1 | 7/2019 | Kakinada et al. | |
| 2019/0335336 A1 | 10/2019 | Cimpu et al. | |
| 2019/0394704 A1 | 12/2019 | Lou et al. | |
| 2020/0008007 A1 | 1/2020 | Belghoul et al. | |
| 2020/0170061 A1 | 5/2020 | Richards | |
| 2020/0252933 A1 | 8/2020 | Hmimy et al. | |
| 2020/0275457 A1 | 8/2020 | Hmimy | |
| 2020/0305159 A1 | 9/2020 | Raghothaman et al. | |
| 2020/0322786 A1 | 10/2020 | Yang et al. | |
| 2021/0409549 A1 | 12/2021 | Russell et al. | |

OTHER PUBLICATIONS

Extended European Search Report dated Jan. 24, 2020 from European Patent Office in Application No. EP19183961.2.
Extended European Search Report issued Jan. 21, 2022 in European Application No. 21198345.7.
Final Office Action issued in the U.S. Patent and Trademark Office in related U.S. Appl. No. 16/421,939 mailed Nov. 15, 2022.
Non-Final Office issued in the U.S. Patent and Trademark Office in related U.S. Appl. No. 16/819,337 mailed Sep. 14, 2022.
Office Action dated Mar. 10, 2023 from the Korean Patent Office in Application No. 10-2019-0024415.
Mnay Bheemesh et al.: "Radio resource management in coordinated antenna system deployments" Applied Computing, ACM, 2 Penn Plaza, Suite 701 New York NY 10121-0701 USA, Mar. 18, 2013 (Mar. 18, 2013), pp. 573-576 (total 4 pages).
Winn Forum, "CBRS Deployment Guidelines for Installers Document WINNF-TR-5001", Dec. 11, 2018, Version V.1.0.0., pp. i-4 (8 total pages).
Winn Forum: "Interim SAS to CBSD Protocol Technical Report-A Historical Document WINNF-15-H-0023 Spectrum Sharing Committee Work Group 3 (Protocols) SAS to CBSD Protocol Terms, Conditions & Notices", Jan. 3, 2017 (Jan. 3, 2017), total 24 pages.
Office Action issued in parent U.S. Appl. No. 16/421,939 mailed Nov. 25, 2020.
Kyung Mun, "White Paper: Making Neutral Host a Reality with OnGo", Mobile Experts, Dec. 2018, CBRS Alliance (Year 2018).
Final Office Action issued in parent U.S. Appl. No. 16/421,939 mailed Jun. 14, 2021.
Office Action issued in parent U.S. Appl. No. 16/421,939 mailed Jan. 18, 2022.
Office Action issued in parent U.S. Appl. No. 16/421,939 mailed Sep. 15, 2022.
Notice of Allowance issued in parent U.S. Appl. No. 16/421,939 mailed Mar. 27, 2023.

* cited by examiner

METHOD OF OPERATING SPECTRUM SHARING SYSTEM INTEROPERATING WITH DISTRIBUTED ANTENNA SYSTEM

CROSS-REFERENCE TO RELATED APPLICATION

This application is a continuation of U.S. application Ser. No. 16/421,939 filed May 24, 2019, which claims the benefit of Korean Patent Application No. 10-2018-0160328, filed on Dec. 12, 2018, and Korean Patent Application No. 10-2019-0024415, filed on Feb. 28, 2019, in the Korean Intellectual Property Office, the disclosures of which are incorporated herein in its entirety by reference.

BACKGROUND

1. Field

One or more embodiments relate to a spectrum sharing system. More particularly, the disclosure relates to a method of operating a spectrum sharing system comprising a distributed antenna system.

2. Description of the Related Art

In order to cope with the increasing demand of mobile traffic and the limitation of frequency spectrum (or spectrum) retrieval and relocation, the introduction of radio station management and a service system based on spectrum sharing is being actively discussed in order to efficiently utilize limited radio resources (e.g., a bandwidth and transmission power) mainly in major advanced countries.

For example, the United States has announced the introduction of Citizens Broadband Radio Service (CBRS), which is an urban spectrum sharing service in the 3.5 GHz band, and the United Kingdom has announced the introduction of spectrum co-use for the 3.8 GHz to 4.2 GHz bands based on the Framework for Spectrum Sharing.

Such a spectrum sharing service is expected not only to be applied in the existing specific service field but also to provide a sufficient advantage for substituting and converging various services as well as supplementing a mobile communication service such as 5G.

Meanwhile, a distributed antenna system (DAS) is a system composed of spatially separated antenna nodes (e.g., remote units) connected to a common node (e.g., a head-end unit) through a transmission medium such as optical fiber, wired Ethernet, and the like, or a transmission network.

The DAS is installed in an area where radio signals are not received or where radio signals are weak, such as inside buildings, underground buildings, subways, tunnels, apartment complexes in a residential area, stadiums, and the like to extend coverage of a base station by providing communication services to even a shadow area where signals of the base station are difficult to reach.

The DAS is closely related to a neutral host radio access network model proposed by the CBRS Alliance, and is likely to operate with the spectrum sharing system or to be applied as a part of the spectrum sharing system.

However, a concrete method of controlling DAS and the spectrum sharing system has not been proposed yet.

SUMMARY

One or more embodiments include a method of operating a spectrum sharing system interoperating with a distributed antenna system.

The disclosure is not limited to the above objectives, but other objectives not described herein may be clearly understood by those of ordinary skilled in the art from descriptions below.

According to an aspect of the disclosure, there is provided a method of allocating shared radio resources in a spectrum shared system (SSS), the method includes: obtaining, by a system controller of the SSS, identification information from at least one radio service device of the SSS and a node unit of a distributed antenna system (DAS); determining, by the system controller of the SSS, whether the at least one radio service device interoperates with the DAS based on the identification information; and allocating, by the system controller of the SSS, the shared radio resources to the at least one radio service device and the DAS, respectively, based on a result of the determining of interoperating.

According to an exemplary embodiment, the identification information may include an identifier indicating whether the at least one radio service device interoperates with the DAS.

According to an exemplary embodiment, the determining of interoperating may include determining whether the at least one radio service device interoperates with the DAS according to whether respective identifiers of the at least one radio service device and the node unit match or correspond to each other.

According to an exemplary embodiment, the identification information with respect to each of the at least one radio service device and the node unit may include at least two of an indication of radio access technology (RAT), operation parameters associated with the RAT, and a geographic location.

According to an exemplary embodiment, the determining of interoperating may include determining, by the system controller of the SSS, whether the at least one radio service device interoperates with the DAS according to whether at least some of the indication of the RAT, the operation parameters associated with the RAT, and the geographic location match or correspond to each other.

According to an exemplary embodiment, the obtaining of the identification information may include obtaining, by the system controller of the SSS, the identification information as a portion of a registration process of the at least one radio service device and the node unit.

According to an exemplary embodiment, the obtaining of the identification information may include obtaining, by the system controller of the SSS, the identification information through at least one of a resource request from the at least one radio service device and the node unit or a periodic status update of the at least one radio service device and the node unit.

According to an exemplary embodiment, the allocating of the shared radio resources may include allocating, by the system controller of the SSS, the shared radio resources such that the shared radio resources allocated to the DAS comprise the shared radio resources allocated to the at least one radio service device.

According to an exemplary embodiment, the node unit may be a head-end unit communicatively connected to the at least one radio service device.

According to an exemplary embodiment, the node unit may be a remote unit communicatively connected to the at least one radio service device.

According to another aspect of the disclosure, there is provided a method of allocating shared radio resources in a spectrum shared system (SSS), the method includes: obtaining, by a system controller of the SSS, interoperating information from any one of at least one radio service device of the SSS and a node unit of a distributed antenna system (DAS); and allocating, by the system controller of the SSS, the shared radio resources to the at least one radio service device and the DAS, respectively, based on the interoperating information.

According to an exemplary embodiment, the obtaining of the interoperating information may include obtaining, by the system controller of the SSS, the interoperating information from the at least one radio service device, and the interoperating information may include information about at least two of an interoperating state of the at least one radio service device and the DAS, an indication of radio access technology (RAT) provided by the at least one radio service device through the DAS, operation parameters associated with the RAT, and a geographic location.

According to an exemplary embodiment, the allocating of the shared radio resources may include allocating, by the system controller of the SSS, the shared radio resources to the at least one radio service device and the DAS, respectively, based on the interoperating information, and the method may further include controlling, by the at least one radio service device, use of the shared radio resources of the DAS by transmitting a result of the allocating to the DAS to the node unit, after the allocating of the shared radio resources.

According to an exemplary embodiment, the obtaining of the interoperating information may include obtaining, by the system controller of the SSS, the interoperating information from the node unit, wherein the interoperating information may include information about at least two of an interoperating state of the at least one radio service device and the DAS, an indication of an RAT of the at least one radio service device supported by the node unit, operation parameters associated with the RAT, and a geographic location.

According to an exemplary embodiment, the allocating of the shared radio resources may include allocating, by the system controller of the SSS, the shared radio resources to the at least one radio service device and the DAS, respectively, based on the interoperating information, and the method may further include controlling, by the node unit, use of the shared radio resources of the at least one radio service device by transmitting a result of the allocating to the at least one radio service device to the at least one radio service device, after the allocating of the shared radio resources.

According to another aspect of the disclosure, there is provided a method of allocating shared radio resources in a spectrum shared system (SSS), the method includes obtaining, by a system controller of the SSS, virtualized radio service device information from any one of at least one radio service device of the SSS and a node unit of a distributed antenna system (DAS); and allocating, by the system controller of the SSS, the shared radio resources to the at least one radio service device and the DAS, integrally, based on the virtualized radio service device information.

According to an exemplary embodiment, the virtualized radio service device information may include information about at least two of an indication of radio access technology (RAT) that is integrally supported by the at least one radio service device and the DAS, operation parameters associated with the RAT, and a geographic location.

According to an exemplary embodiment, the obtaining of the virtualized radio service device information may include obtaining, by the system controller of the SSS, the virtualized radio service device information from the at least one radio service device, and the method may further include: determining, by the at least one radio service device, an operation of each of the at least one radio service device and the DAS based on a result of the allocating, after the allocating of the shared radio resources; and controlling, by the at least one radio service device, use of the shared radio resources of each of the at least one radio service device and the DAS according to the determined operation.

According to an exemplary embodiment, the obtaining of the virtualized radio service device information may include obtaining, by the system controller of the SSS, the virtualized radio service device information from the node unit, and the method may further include: determining, by the node unit, an operation of each of the at least one radio service device and the DAS based on a result of the allocating after the allocating of the shared radio resources; and controlling, by the node unit, use of the shared radio resources of each of the at least one radio service device and the DAS according to the determined operation.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
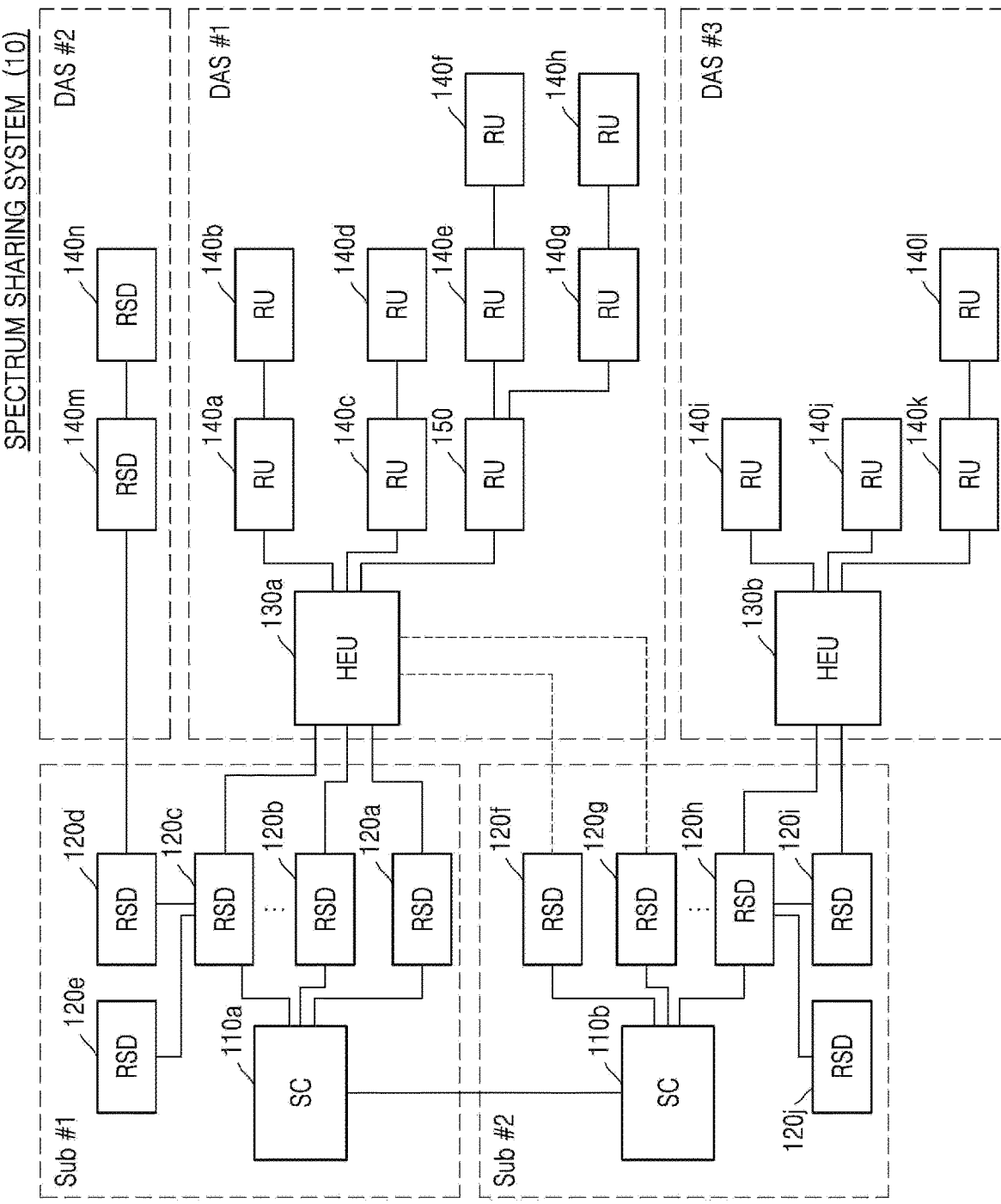
FIG. 1 is a block diagram of a spectrum sharing system according to an example embodiment of the present disclosure.

An example of a spectrum sharing system of the present disclosure is a new type of system in which two or more wireless communication systems provide authorized shared access in conjunction with an in-building wireless communication system (e.g., a distributed antenna system). Such a spectrum sharing system may be developed from a general CBRS system that provides or participates in authorized shared access between two or more wireless communication networks or two or more wireless communication systems (e.g., CBSDs or CBSD domain proxies).

As the spectrum sharing system of the present disclosure operates with the in-building wireless communication system, it is required to protect radio resources from each other based on constraints due to radio access technologies (RATs) being used by the in-building wireless communication system as well as RATs being used by general competing users or wireless communication systems. In addition, it is further required to protect radio resources from each other based on constraints due to a plurality of operating modes for the RATs.

In a case of the distributed antenna system implemented with neutral host architecture, various radio services are integrated and provided within service coverage. This is because various problems such as interference may be caused when the radio resources are shared without considering interoperating of the distributed antenna system in the spectrum sharing system.

In order to meet these requirements and to allow for optimization of radio resource allocations, various aspects of the present disclosure suggest technologies that allow spectrum sharing system controllers to identify whether CBSDs, CBSD domain proxies, and a DAS interoperate with each other using certain information provided from at least one of the CBSDs, the CBSD domain proxies, and the DAS interoperating with the CBSDs and the CBSD domain proxies, and to optimize the allocation of radio resources to the CBSDs, the CBSD domain proxies, and the DAS based on a result of the identification of interoperating.

In various embodiments, the technologies described in the present disclosure and systems and devices for implementation thereof may utilize RATs such as WiFi or WiMax as well as RATs such as code division multiple access (CDMA), time division multiple access (TDMA), frequency division multiple access (FDMA), orthogonal FDMA (OFDMA), single-carrier FDMA (SC-FDMA), LTE, a global system for mobile communications (GSM), 5G NR, and the like to support shared access to the radio spectrum between networks (or systems).

Various other embodiments and features according to the inventive concept of the present disclosure will be further described later below. It should be apparent that the teachings herein may be implemented in a wide variety of forms and any particular structure, function, or both, disclosed herein are merely exemplary and not limiting. Based on the teachings herein, those of ordinary skill in the art will appreciate that aspects disclosed herein may be implemented independently of any other aspects and two or more of these aspects may be combined in various ways. For example, a device or a method may be implemented by using any number of aspects set forth herein. Furthermore, the device or the method may be implemented with structures and functions of one or more of the aspects described herein, or may be implemented by using structures and functions of other aspects. For example, the method may be implemented as a part of instructions stored on a non-transitory computer-readable recording medium for execution on a system, a device, an apparatus and/or a processor, or a computer. Furthermore, one aspect may include at least one component of the claim.

Hereinafter, various embodiments of the present disclosure will be described in detail in order.

FIG. 1 is a block diagram of a spectrum sharing system 10 according to an example embodiment of the present disclosure.

The spectrum sharing system 10 may include system controllers 110a and 110b, radio service devices 120a to 120j, and first to third distributed antenna systems DAS #1 to DAS #3.

The spectrum sharing system 10 may allow shared radio resources to be dynamically allocated to multiple users and radio service providers associated with the radio service devices 120a to 120j and the first to third distributed antenna systems DAS #1 to DAS #3 by control of the system controllers 110a and 110b. In an exemplary embodiment, the shared radio resources may be operating frequencies, power limits, a geographical area, or the like. In addition, the spectrum sharing system 10 may provide some degree of protection to existing users (e.g., fixed satellite systems, WISPs, and government/military systems) with potentially higher priorities and other users/radio service providers while allowing the shared radio resources to be dynamically allocated.

The system controllers 110a and 110b may control overall spectrum sharing in a system by accepting requests for use of the shared radio resources from the radio service devices 120a to 120j and/or the first to third distributed antenna systems DAS #1 to DAS #3, by solving conflicts or over-constraints in these requests, and by approving the use of the shared radio resources for the radio access services.

For example, the system controllers 110a and 110b may determine whether some of the radio service devices 120a to 120j and some of the first to third distributed antenna systems DAS #1 to DAS #3 interoperate with each other, based on identification information, interoperating information, etc. obtained from the radio service devices 120a to 120j and the first to third distributed antenna systems DAS #1 to DAS #3, during a registration process, a resource request process, or a periodic status update process from among operations for allocating and reallocating the shared radio resources, and may allocate the shared radio resources in consideration of a result of the determination of interoperating. This will be described in more detail later below with reference to FIGS. 3 to 10.

Meanwhile, the term "interoperating" means that at least one of the radio service devices 120a to 120j is used as a signal source of at least one of the first to third distributed antenna systems DAS #1 to DAS #3.

The term "determine" includes a wide variety of actions. For example, the term "determine" may include computing, processing, deriving, examining, looking up (e.g., looking up in a table, database, or other data structure), identifying, and the like. The term "determine" may also include receiving (e.g., receiving information), accessing (accessing data in a memory), and the like. The term "determine" may also include resolving, selecting, choosing, establishing, and the like.

The radio service devices 120a to 120j may be devices that provide radio services using any radio access technology, such as a base station, an access point, or any type of radio frequency (RF) access system.

Some of the radio service devices 120a to 120j may provide radio services to an end-user device in a cell by using a spectrum allocated by direct control of the system controllers 110a and 110b.

Alternatively, the others of the radio service devices 120a to 120j may provide radio services to end-user devices through a corresponding distributed antenna system of the first to third distributed antenna systems DAS #1 to DAS #3 by using a spectrum allocated by direct control or indirect control (e.g., control through a distributed antenna system) of the system controllers 110a and 110b.

Meanwhile, as shown in FIG. 1, each of the radio service devices 120c and 120h of the radio service devices 120a to 120j may function as a domain proxy for sub-radio service devices.

The system controller 110a and the radio service devices 120a to 120e may constitute the first sub system Sub #1 and the system controller 110b and the radio service devices 120f to 120j may constitute a second sub system Sub #2. Here, the division of the first and second sub systems Sub #1 and Sub #2 is only for the convenience of description of radio service devices managed by a corresponding system controller for each geographical area, and the system controllers 110a and 110b interoperate with each other to control allocation of shared radio resources throughout the spectrum sharing system 10 and the like.

Each of the first to third distributed antenna systems DAS #1 to DAS #3 may aggregate/distribute radio services provided from corresponding at least one radio service device of the radio service devices 120a to 120j by direct or indirect control (control through a radio service device) of the system controllers 110a and 110b and provide the combined/distributed radio services to end-user devices in coverage.

According to an embodiment, the first distributed antenna system DAS #1 may include a head-end unit 130a connected to the radio service devices 120a, 120b, and 120c of the first sub system Sub #1, remote units 140a and 140c connected to the head-end unit 130a in a point-to-multipoint structure, and remote units 140b and 140d respectively connected to the corresponding remote units 140a and 140c in a daisy-chain structure. As shown in FIG. 1, the first distributed antenna system DAS #1 may further optionally include an expansion unit 150, and remote units 140e to 140h may be connected to the expansion unit 150 in a mixed form of the point-to-multipoint structure and the daisy-chain structure.

The first distributed antenna system DAS #1 may provide radio services from the radio service devices 120a, 120b, and 120c to the end-user devices by using a radio resource allocated according to direct or indirect control (e.g., control through a radio service device) of the system controller 110a.

In an exemplary embodiment, the head-end unit 130a may be further connected to the radio service devices 120f and 120g connected to the system controller 110b in the second sub system Sub #2. In this case, the first distributed antenna system DAS #1 may use shared radio resource by interoperating control of the system controllers 110a and 110b.

According to an embodiment, the second distributed antenna system DAS #2 may include a remote unit 140m connected to the radio service device 120d of the first sub system Sub #1 and a remote unit 140n connected to the remote unit 140m in a daisy-chain structure. Unlike a remote radio head, which is an RF processing unit of a distributed base station, the remote units 140m and 140n may integrate a plurality of radio services. Accordingly, although FIG. 1 shows only the embodiment in which the remote units 140m and 140n are connected to one radio service device 120d, the remote units 140m and 140n may be connected to a plurality of radio service devices either directly or with a certain network therebetween.

Based on the disclosure above, the second distributed antenna system DAS #2 may provide radio services from the radio service device 120d to the end-user devices by using the radio resource allocated according to direct or indirect control of the system controller 110a.

According to an embodiment, the third distributed antenna system DAS #3 may include a head-end unit 130b connected to the radio service devices 120h and 120i of the second sub system Sub #2, remote units 140i to 140k connected to the head-end unit 130b in a point-to-multipoint structure, and a remote unit 140l connected to the remote unit 140k in a daisy-chain structure.

The third distributed antenna system DAS #3 may provide radio services from the radio service devices 120h and 120i to the end-user devices by using a radio resource allocated according to direct or indirect control (e.g., control through a radio service device) of the system controller 110b.

The head-end unit 130b may also be connected to some radio service devices included in the first sub system Sub #1, similar to the head-end unit 130a which may be connected to the radio service devices 120f and 120g included in the second sub system Sub #2.

Elements of the spectrum sharing system 10, i.e., a system controller, a radio service device, and a distributed antenna system, and a topology for connecting them are not limited to the embodiment shown in FIG. 1, and various modifications and variations are possible.

FIGS. 2A to 2E are block diagrams of elements of a spectrum sharing system according to an example embodiment of the present disclosure. In the description of FIGS. 2A to 2E, the same or corresponding reference numerals as those in FIG. 1 denote the same or corresponding elements, and therefore, repeated descriptions thereof will not be given herein.

Figure 2A:
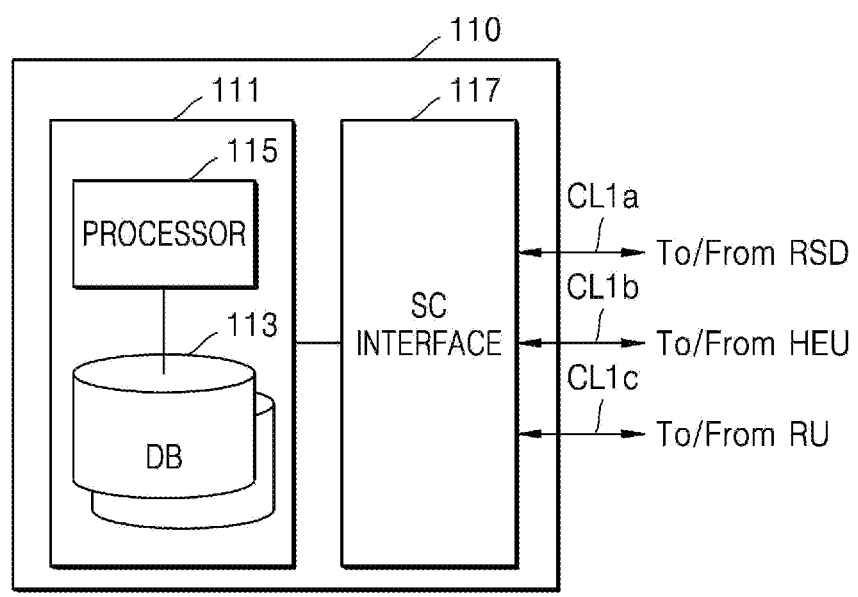
FIGS. 2A to 2E are block diagrams of elements of a spectrum sharing system according to an example embodiment of the present disclosure.

Referring to FIGS. 1 and 2A, a system controller 110 may include a system controller processing system 111 (hereinafter referred to as an SC processing system) and a system controller interface 117 (hereinafter referred to as an SC interface).

The SC processing system 111 may control the overall operation of the spectrum sharing system 10. For example, the SC processing system 111 may control processing operations for a registration request of at least one radio service device 120 connected to the system controller 110 and at least one distributed antenna system DAS, processing operations for a radio resource/authorization request, status update processing operations of the radio service device 120 and the distributed antenna system DAS, and the like.

In particular, the SC processing system 111, as a part of the above-described operations or as a separate operation, may determine whether the radio service device 120 interoperates with the distributed antenna system DAS to reflect an interoperating operation state when shared radio resources are allocated.

The SC processing system 111 may include at least one database 113 and a processor 115.

The at least one database 113 may store rules necessary for management and operation of the spectrum sharing system 10, various information related to users, for example, information on priorities (e.g., a top-level incumbent user, a priority access authorized user, a general access authorized user), geographical location and/or time information, coverage, an maximum allowable power output level, a modulation type, interference threshold information, and so on.

The processor 115 may determine whether the radio service device 120 interoperates with the distributed antenna system DAS based on identification information, interoperating information, virtualization information, etc. obtained from the radio service device 120 and/or the distributed antenna system DAS (in more detail, node units of the distributed antenna system DAS such as a head-end unit 130 and a remote unit 140). Specific embodiments thereof will be described in more detail later below with reference to FIGS. 3 to 10.

The processor 115 may connect to the database 113 and recognize a spectrum usage state, a usage amount, and the like of users having priority at specific times and/or geographical locations related to the radio service device 120 and the distributed antenna system DAS that are determined whether to interoperate with each other.

The processor 115 may allocate radio resources available for the radio service device 120 and the distributed antenna system DAS based on a result of the recognition.

The processor 115 may transmit allocation information indicating a result of the allocation of the radio resources to the radio service device 120 and/or the distributed antenna system DAS to control the use of shared radio resources by the radio service device 120 and the distributed antenna system DAS.

The SC processing system 111 may be communicatively connected to the radio service device 120, the head-end unit 130, and the remote unit 140 through the first communication links CL1a, CL1b, and CL1c, respectively, and may transmit and receive information for spectrum sharing access control to/from the radio service device 120, the head-end unit 130, and the remote unit 140 through the SC interface 117.

The SC processing system 111 may transmit and receive the information to and from the radio service device 120, the head-end unit 130, and the remote unit 140 through the SC interface 117 by using a security protocol such as a Hyper-Text Transfer Protocol over Secure Socket Layer (HTTPS) protocol.

Meanwhile, the first communication links CL1a, CL1b, and CL1c may be, for example, the Internet, but are not limited thereto. The first communication links CL1a, CL1b, and CL1c may be any wired and/or wireless communication link such as WiMax, network optical fiber, an Ethernet-based cable, and the like.

Figure 2B:
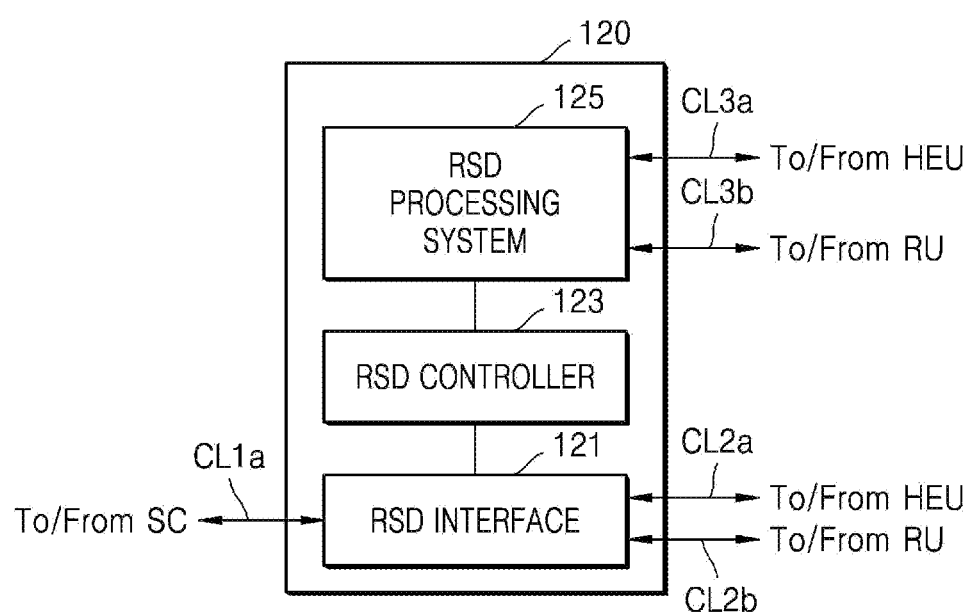

Referring to FIGS. 1 and 2B, the radio service device 120 may include a radio service device interface 121 (hereinafter referred to as an RSD interface), a radio service device controller 123 (hereinafter referred to as an RSD controller), and a radio service device processing system 125 (hereinafter referred to as an RSD processing system).

The RSD interface 121 is for the radio service device 120 to transmit and receive pieces of information necessary for spectrum sharing access to and from the system controller 110, the head-end unit 130, and the remote unit 140.

That is, the radio service device 120 may transmit and receive the information to and from the system controller 110 connected through the first communication link CL1a and the remote unit 140 and the head-end unit 130 connected through second communication links CL2a and CL2b by using the RSD interface 121.

Here, the second communication links CL2a and CL2b may be, for example, the Internet, but are not limited thereto. The second communication links CL2a and CL2b may be any wired and/or wireless communication link such as WiMax, network optical fiber, an Ethernet-based cable, and the like.

The RSD controller 123 may generate its own information related to a radio service or the like provided by the radio service device 120, and identification information, interoperating information, virtualization information, and the like indicating whether the distributed antenna system DAS interoperates with the radio service device 120. Further, the RSD controller 123 may transmit the pieces of information to the system controller 110, the head-end unit 130, or the remote unit 140 through the RSD interface 121.

The RSD controller 123 may control the RSD processing system 125 according to allocation information or the like transmitted from the system controller 110 or from the head-end unit 130 and the remote unit 140 through the RSD interface 121.

The RSD processing system 125 may activate a radio resource (e.g., a frequency spectrum or channel) allocated by the control of the RSD controller 123 and use the activated radio resource to generate service signals of the radio access technology that the radio service device 120 may support.

The RSD processing system 125 may transmit the generated service signals to the head-end unit 130 and the remote unit 140 through third communication links CL3a and CL3b.

Here, the third communication links CL3a and CL3b may be media for transmitting analog or digital type service signals, for example, RF cables, optical fibers, Ethernet-based cables, and the like. Meanwhile, although not shown in FIG. 2B, the RSD processing system 125 may include converters for converting service signals generated to correspond to the third communication links CL3a and CL3b.

Figure 2C:
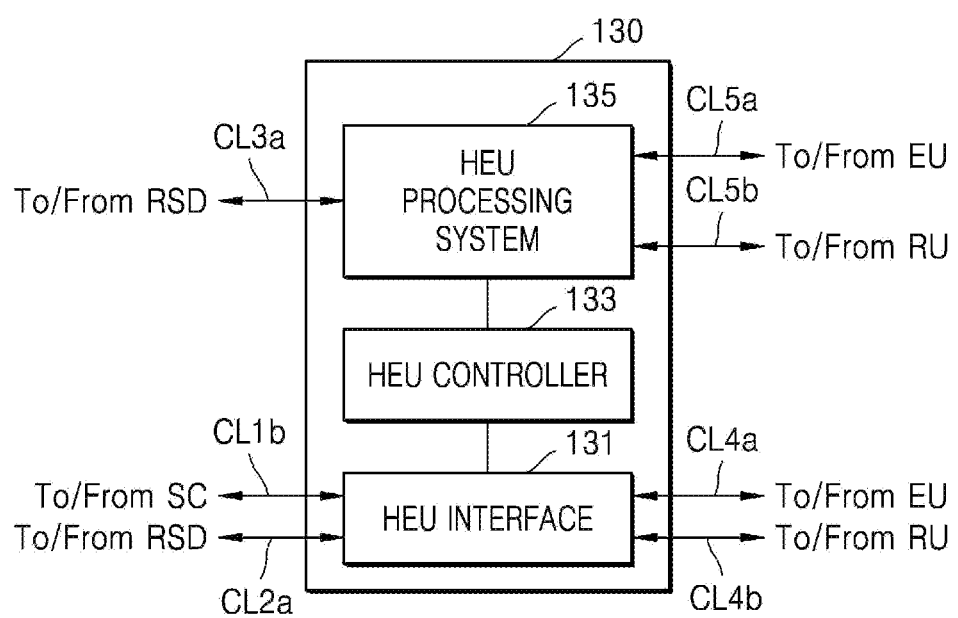

Referring to FIGS. 1 and 2C, the head-end unit 130 may include a head-end unit interface 131 (hereinafter referred to as an HEU interface), a head-end unit controller 133 (hereinafter referred to as an HEU controller), and a head-end unit processing system 135 (hereinafter referred to as an HEU processing system).

The HEU interface 131 is for the head-end unit 130 to transmit and receive pieces of information necessary for spectrum sharing access to and from the system controller 110, the radio service device 120, the remote unit 140, and the expansion unit 150.

The head-end unit 130 may transmit the above-described pieces of information to the system controller 110 and the radio service device 120 by using a certain security protocol, for example, the HTTPS protocol.

The head-end unit 130 may transmit and receive pieces of information such as allocation information to and from the remote unit 140 and the expansion unit 150 by using the above-described security protocol or another security protocol defined by a manufacturer of the distributed antenna system DAS.

The head-end unit 130 may transmit and receive the pieces of information to and from the system controller 110 and the radio service device 120 connected to the head-end unit 130 through the first communication link CL1b and the second communication link CL2a, and the expansion unit 150 and the remote unit 140 connected to the head-end unit 130 through fourth communication links CL4a and CL4b, respectively, by using the HEU interface 131.

Here, the fourth communication links CL4a and CL4b may be, for example, but are not limited to, the Internet, and may include any wired and/or wireless communication link such as WiMax, network optical fiber, an Ethernet-based cable, and the like.

The HEU controller 133 may generate identification information, interoperating information, virtualization information, and the like indicating whether to interoperate with the radio service device 120, and may transmit these information to the system controller 110 or the radio service device 120 through the HEU interface 131.

The HEU controller 133 may control the HEU processing system 135 according to the allocation information transmitted from the system controller 110 or from the radio service device 120 through the HEU interface 131. The transmitted allocation information may be transmitted to the remote unit 140 and the expansion unit 150 through the HEU interface 131.

The HEU processing system 135 may receive service signals of the radio access technology from the radio service device 120 through the third communication link CL3a. FIG. 2C shows an embodiment in which one radio service device 120 is connected to the head-end unit 130. However, when a plurality of radio service devices 120 are connected to the head-end unit 130, the link CL3a may be plural (see FIG. 3, etc.).

The HEU processing system 135 may perform processes such as noise cancellation, filtering, combining, and the like for received signals in an analog way and/or digitally based on allocated radio resources by the control of the HEU controller 133. The HEU processing system 135 may transmit the combined service signals to the expansion unit 150 and the remote unit 140 through the fifth communication links CL5a and CL5b.

Here, the fifth communication links CL5a and CL5b are media for transmitting analog or digital type service signals, for example, an RF cable, an optical fiber, an Ethernet-based cable, and the like. Although not shown in FIG. 2C, the HEU processing system 135 may include converters for converting the combined service signals to correspond to the fifth communication links CL5a and CL5b.

Figure 2D:
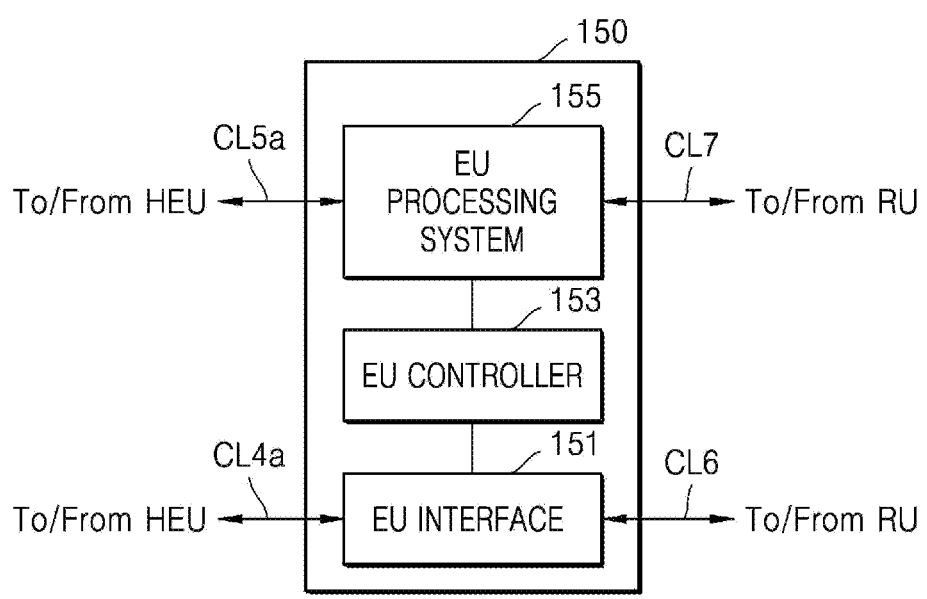

Referring to FIGS. 1 and 2D, the expansion unit 150 may include an expansion unit interface 151 (hereinafter referred to as an EU interface), an expansion unit controller 153 (hereinafter referred to as an EU controller), and an expansion unit processing system 155 (hereinafter referred to as an EU processing system).

The EU interface 151 is for transmitting and receiving pieces of information necessary for spectrum sharing access to and from the head-end unit 130 and the remote unit 140.

The expansion unit 150 may transmit and receive the necessary pieces of information to and from the head-end unit 130 and the remote unit 140 by using a security protocol such as the HTTPS protocol or other security protocols defined by the manufacturer of the distributed antenna system DAS.

The expansion unit 150 may transmit and receive the necessary pieces of information to and from the head-end unit 130 connected through a fourth communication link CL4a and the remote unit 140 connected through a sixth communication link CL6 by using the EU interface 151.

Here, the sixth communication link CL6 may be, for example, but is not limited to, the Internet, and may include any wired and/or wireless communication link such as WiMax, network optical fiber, an Ethernet-based cable, and the like.

The EU controller 153 may control the EU processing system 155 according to the allocation information of radio resources transmitted from the head-end unit 130 through the EU interface 151.

The EU processing system 155 may receive the combined service signals from the head-end unit 130 through the fifth communication link CL5a and perform processes such as amplification and the like on the combined service signals in an analog way and/or digitally based on allocated radio resources by the control of the EU controller 153. Thereafter, the EU processing system 155 may transmit the processed service signals to the remote unit 140 through a seventh communication link CL7.

Here, the seventh communication link CL7 may be a medium for transmitting analog or digital type service signals, for example, an RF cable, an optical fiber, an Ethernet-based cable, and the like. Although not shown in FIG. 2D, the EU processing system 155 may include a converter for converting a signal received through the fifth communication link CL5a into a signal suitable for processing therein and converters for converting a processed signal to correspond to the seventh communication link CL7.

Figure 2E:
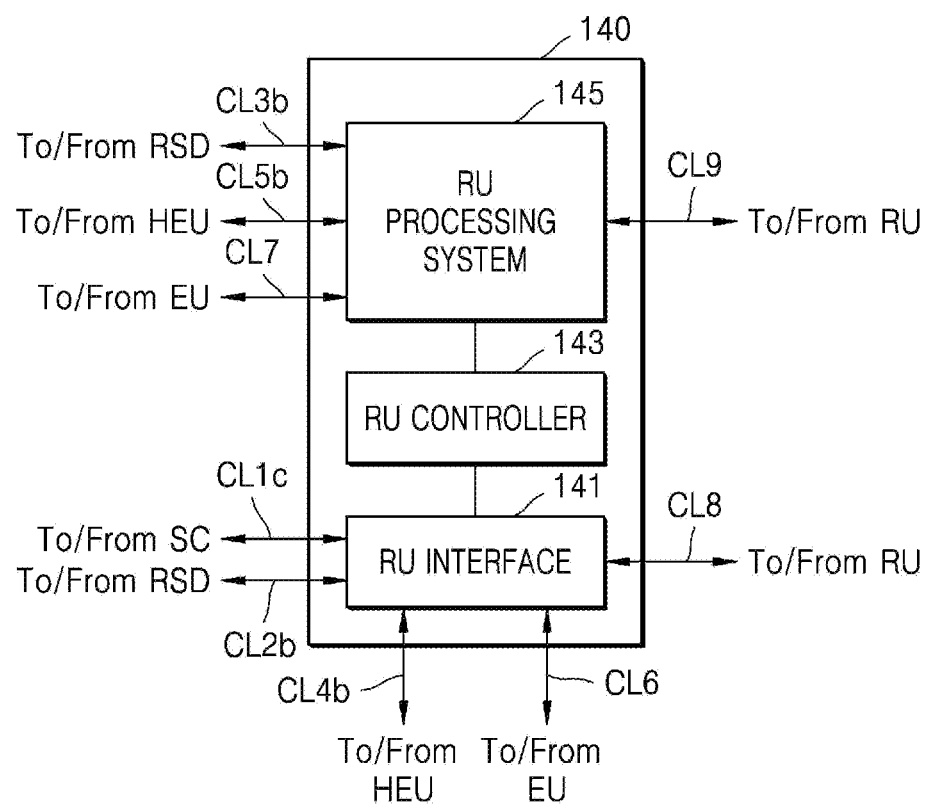

Referring to FIGS. 1 and 2E, the remote unit 140 may include a remote unit interface 141 (hereinafter referred to as an RU interface), a remote unit controller 143 (hereinafter referred to as an RU controller), and a remote unit processing system 145 (hereinafter referred to as an RU processing system).

The RU interface 141 is for transmitting and receiving pieces of information necessary for spectrum sharing access to and from the system controller 110, the radio service device 120, the head-end unit 130, the expansion unit 150, and other remote units.

The remote unit 140, according to an embodiment, may transmit and receive the pieces of information to and from the system controller 110 and the radio service device 120 by using a security protocol such as the HTTPS protocol and may also transmit and receive the information to and from the head-end unit 130 and the expansion unit 150 by using other security protocols besides the HTTPS protocol.

The remote unit 140 may transmit and receive the pieces of information to and from the system controller 110, the radio service device 120, the head-end unit 130, the expansion unit 150, and other remote units that are connected to the remote unit 140, respectively, through the first communication link CL1c, the second communication link CL2b, the fourth communication link CL4b, the sixth communication link CL6, and an eighth communication link CL8.

Here, the eighth communication link CL8 may be, for example, but is not limited to, the Internet, and may include any wired and/or wireless communication link such as WiMax, network optical fiber, an Ethernet-based cable, and the like.

The RU controller 143 may control the RU processing system 145 according to the allocation information of radio resources transmitted from the system controller 110, the radio service device 120, the head-end unit 130, or the expansion unit 150 through the RU interface 141.

The RU processing system 145 may receive a service signal from the radio service device 120 through the third communication link CL3b, combined service signals from the head-end unit 130 through the fifth communication link CL5b, or amplified service signals from the expansion unit 150 through the seventh communication link CL7.

The RU processing system 145 may perform processes such as filtering, amplification, and the like for the received service signals in a analog way and/or digitally based on allocated radio resources by the control of the RU controller 143, and may transmit the processed service signals to an end-user device (not shown) or another remote unit through a ninth communication link CL9.

Here, the ninth communication link CL9 may be a medium for transmitting analog or digital type service signals, for example, an RF cable, an optical fiber, an Ethernet-based cable, and the like. Although not shown in FIG. 2E, the RU processing system 145 may include a converter for converting the service signals received through the third communication link CL3b, the fifth communication link CL5b, and the seventh communication link CL7 into signals suitable for processing therein and a converter for converting amplified signals to correspond to the ninth communication link CL9.

Figure 3:
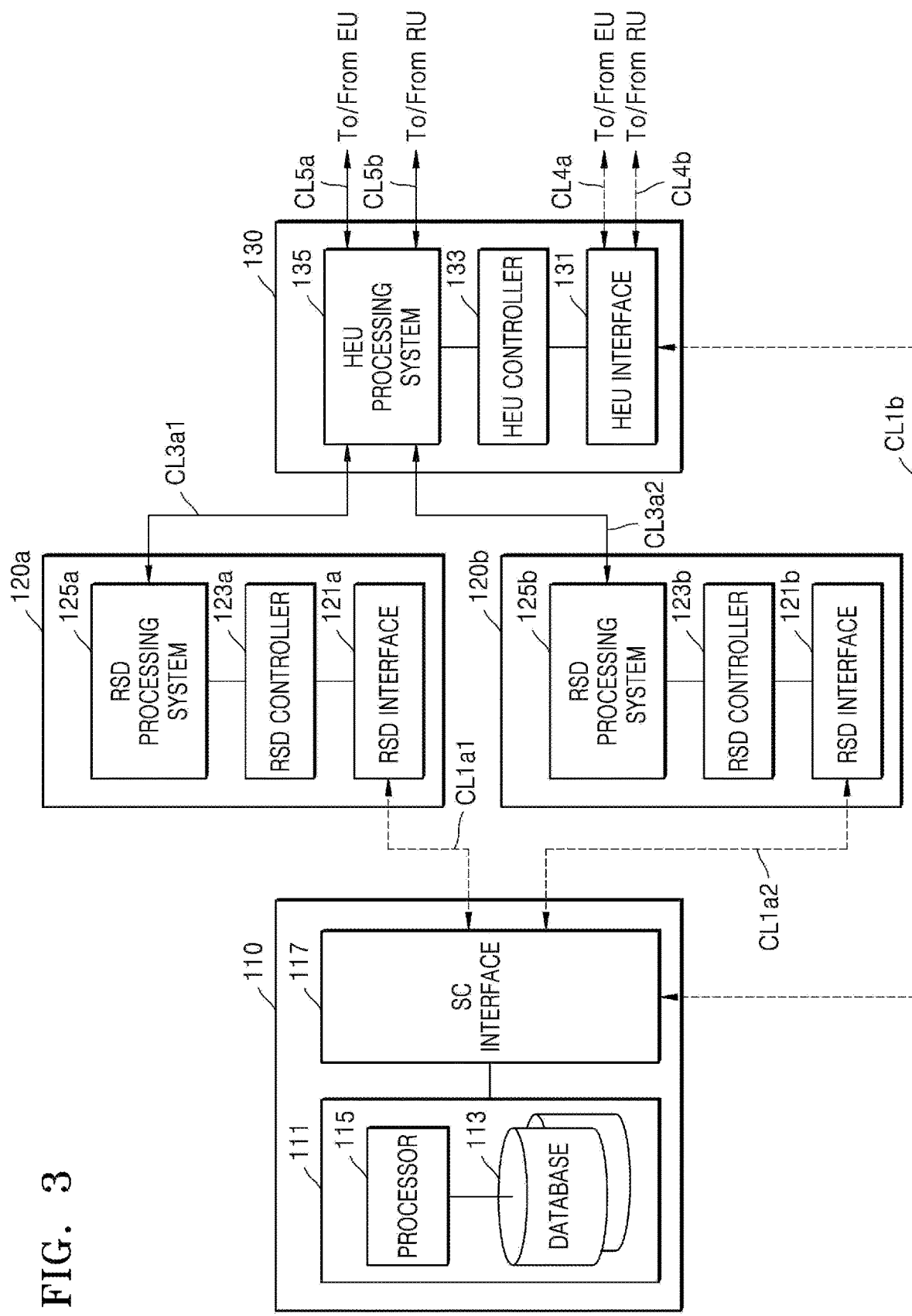
FIG. 3 is a block diagram of a spectrum sharing system according to an example embodiment of the present disclosure.
Figure 4:
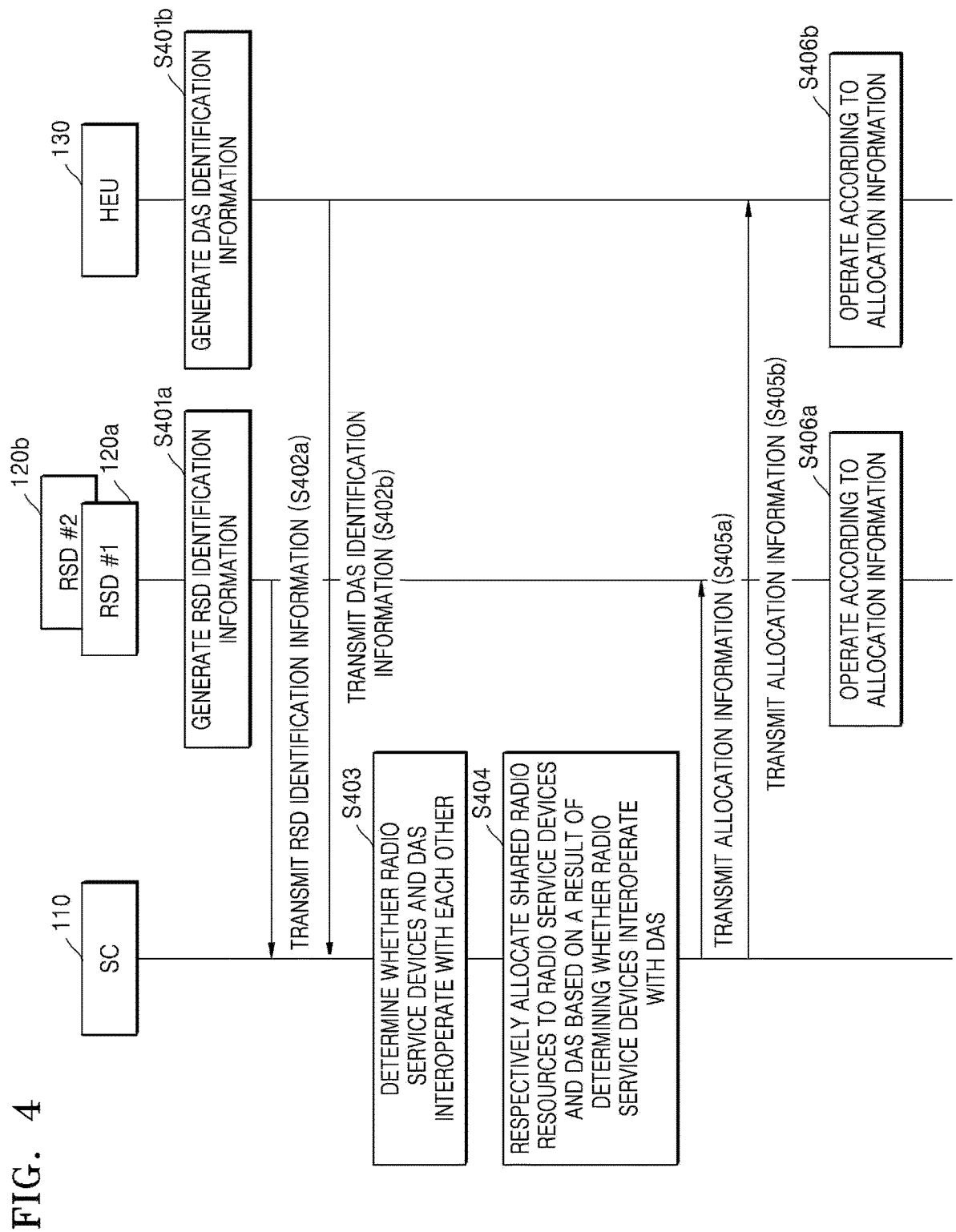
FIG. 4 is a flowchart for illustrating a method of operating the spectrum sharing system shown in FIG. 3.

FIG. 3 is a block diagram of a spectrum sharing system according to an example embodiment of the present disclosure, and FIG. 4 is a flowchart for illustrating a method of operating the spectrum sharing system shown in FIG. 3.

In more detail, the spectrum sharing system shown in FIG. 3 illustrates an embodiment in which the head-end unit 130 of the distributed antenna system DAS interoperates with the plurality of radio service devices 120a and 120b. In this embodiment, the system controller 110 and the plurality of radio service devices 120a and 120b and the system controller 110 and the head-end unit 130 may be respectively and communicatively connected to each other through respective interfaces to transmit and receive information necessary for spectrum sharing access.

In FIG. 3, between the plurality of radio service devices 120a and 120b and the head-end unit 130 and between the head-end unit 130, the remote unit 140 (refer to FIG. 1) and the expansion unit 150 (refer to FIG. 1) constituting the distributed antenna system DAS, radio service signals provided to/from an end-user device are transmitted as analog or digital type signals. Processes related to configurations for this will not be given herein for convenience of explanation. This also applies to FIGS. 5 and 8 below.

In the description of FIGS. 3 and 4, the same or corresponding reference numerals as those in FIGS. 1 to 2C denote the same or corresponding elements, and therefore, repeated descriptions thereof will not be given herein. In the spectrum sharing system according to the present embodiment, allocation operations of shared radio resources for the distributed antenna system DAS including the system controller 110, the plurality of radio service devices 120a and 120b, and the head-end unit 130 will be mainly described.

Referring to FIGS. 1 to 2C, 3, and 4, in operation S401a, the plurality of radio service devices 120a and 120b generate identification information. In operation S402a, the head-end unit 130 also generates identification information.

The identification information may include at least one of a device identifier, an indication of provided radio access technology (RAT), operating parameters associated with the radio access technology (e.g., synchronization, a slot structure, a silence interval, etc.), a geographical location (e.g., a concept related to an installation location of a device or units or an installation location of an antenna connected to the device or units, and including a geographical area), and the like of each of the plurality of radio service devices 120a and 120b and the head-end unit 130.

For example, the operating parameters may include frequency spectrum information, level/power information, operating state information, and the like of a service signal conforming to the radio access technology.

The identification information generated by the head-end unit 130 may be regarded as identification information of the distributed antenna system DAS including the head-end unit 130. Accordingly, hereinafter, the identification information generated by the head-end unit 130 is referred to as DAS identification information, and the identification information generated by the plurality of radio service devices 120a and 120b is referred to as RSD identification information.

Each of the RSD identification information and the DAS identification information may further include an identifier indicating interoperating states of the plurality of the radio service devices 120a and 120b and the head-end unit 130.

In some embodiments, the identifier included in the RSD identification information and the identifier included in the DAS identification information may be defined to be equal to each other. For example, the identifiers may be defined as a common id_jointoperation. Accordingly, the plurality of radio service devices 120a and 120b and the head-end unit 130, which interoperate with each other, respectively generate the same identifiers, thereby directly indicating the interoperating states thereof.

In another embodiment, the identifier included in the RSD identification information and the identifier included in the DAS identification information are different from each other but may be defined to correspond to each other. For example, the identifiers may be defined as a combination of a common id_mother and a target device id interoperating with a signal source. In this case, the radio service devices 120a and 120b generates an identifier such as id_mother=none because there is no target device interoperating with the signal source, and the head-end unit 130 generates an identifier such as id_mother=RSD #1 and RSD #2 because the radio service devices 120a and 120b interoperate with the signal source.

Accordingly, the plurality of radio service devices 120a and 120b and the head-end unit 130, which interoperate with each other, respectively generate corresponding identifiers, thereby indirectly indicating the interoperating states thereof.

After the identification information are generated in operations S401a and S401b, in operation S402a, the plurality of radio service devices 120a and 120b transmit the generated RSD identification information to the system controller 110. In operation S402b, the head-end unit 130 transmits the generated DAS identification information to the system controller 110.

Meanwhile, among the above-described embodiments, in the case in which the plurality of radio service devices 120a and 120b and the head-end unit 130 respectively generate identifiers (e.g., id combination of equipment interoperating with id_mother) that are different from each other but corresponding to each other, the plurality of radio service devices 120a and 120b may not transmit an id=mother value to the system controller 110 depending on an embodiment. This is because the system controller 110 may obtain whether the plurality of radio service devices 120a and 120b and the distributed antenna system DAS interoperate with each other only by the identifier received from the head-end unit 130.

In operation S403, the system controller 110 determines whether the plurality of radio service devices 120a and 120b and the distributed antenna system DAS interoperate with each other based on the obtained RSD identification information and DAS identification information.

In some embodiments, the system controller 110 determines whether the plurality of radio service devices 120a and 120b and the distributed antenna system DAS interoperate with each other based on the identifiers respectively included in the RSD identification information and the DAS identification information.

Among the above-described embodiments, in the case in which the plurality of radio service devices 120a and 120b and the head-end unit 130 respectively generate the same identifiers (e.g., id_jointoperation), the system controller 110 determines that the plurality of radio service devices 120a and 120b and the distributed antenna system DAS interoperate with each other according to whether or not the identifiers match each other.

Among the above-described embodiments, in the case in which the plurality of radio service devices 120a and 120b and the head-end unit 130 respectively generate identifiers (e.g., the id combination of equipment interoperating with id_mother) that are different from each other but corresponding to each other, the system controller 110 determines that the plurality of radio service devices 120a and 120b and the distributed antenna system DAS interoperate with each other according to whether or not the identifiers match each other or by the identifier received from the head-end unit 130.

In another embodiment, the system controller 110 may estimate and determine whether the RSD identification information and the DAS identification information interoperate with each other based on the RSD identification information and the DAS identification information even if there is no identifier in the RSD identification information and the DAS identification information.

In more detail, among values included in the RSD identification information and the DAS identification information, when at least some of the respective radio access technologies, operating parameters associated with the radio access technologies, and the geographic locations of the radio service devices 120a and 120b and the head-end unit 130 match or correspond to each other, it can be assumed that the plurality of radio service devices 120a and 120b and the distributed antenna system DAS interoperate with each other.

When the plurality of radio service devices 120a and 120b operate as signal sources of the distributed antenna system DAS, the distributed antenna system DAS conforms to the radio access technology of the plurality of radio service devices 120a and 120b, and the operating parameters of a frequency band associated with the radio access technology.

Furthermore, due to the nature of an in-building wireless communication system, as a geographic location of the plurality of radio service devices 120a and 120b, that is, their own location (or the location of antennas connected thereto), expands to the location (or the location of antennas connected to the remote units) of remote units of the distributed antenna system DAS. Thus, an indication of the geographic location that each of the plurality of radio service devices 120a and 120b transmits to the system controller 110 substantially coincides with an indication of a geographic location that the distributed antenna system DAS transmits to the system controller 110.

Accordingly, when values included in the RSD identification information and values included in the DAS identification information are equal to each other by a certain number, it may be estimated that the plurality of radio service devices 120a and 120b and the distributed antenna system DAS interoperate with each other.

In operation S404, the system controller 110 respectively allocates the shared radio resources to the plurality of radio service devices 120a and 120b and the distributed antenna system DAS based on a result of determining whether the plurality of radio service devices 120a and 120b interoperate with the distributed antenna system DAS.

For example, after recognizing the spectrum usage amount of priority users in a specific geographical location and/or specific time set in which the plurality of radio service devices 120a and 120b and the head-end unit 130 that interoperate with each other are located, the system controller 110 may allocate available shared radio resources in consideration of respective geographical locations, operating states, frequency information, etc. of the plurality of radio service devices 120a and 120b and the distributed antenna system DAS.

Meanwhile, depending on an embodiment, the system controller 110 may allocate radio resources such that the shared radio resources allocated to the distributed antenna system DAS include the shared radio resources respectively allocated to the plurality of radio service devices 120a and 120b. This is because the distributed antenna system DAS combines/distributes the radio resources of the plurality of radio service devices 120a and 120b.

In operation S405a, the system controller 110 transmits allocation information indicating a result of the allocation to the plurality of radio service devices 120a and 120b. In operation S405b, the system controller 110 transmits allocation the allocation information to the head-end unit 130.

In operation S406a, the plurality of radio service devices 120a and 120b operate according to the received allocation information. In operation S406b, the head-end unit 130 operates according to the received allocation information.

Although not shown in FIG. 4, the head-end unit 130 transmits the allocation information received from the system controller 110 to other elements of the distributed antenna system DAS such as the remote unit 140 and the expansion unit 150 so that the distributed antenna system DAS may operate using the allocated radio resources.

According to particular aspects, the identification information described above, which is a part of a registration process between the system controller 110 and the plurality of radio service devices 120a and 120b and the head-end unit 130, may be obtained through at least one of periodic status updates of the plurality of radio service devices 120a and 120b and the head-end unit 130 or resource requests from the plurality of radio service devices 120a and 120b and the head-end unit 130. In some cases, the periodic status updates may include radio environment measurements performed by at least one of the plurality of radio service devices 120a and 120b and the head-end unit 130a. This is also substantially the same in a method of allocating shared radio resources illustrated in FIGS. 6 to 8, 10, and 11 later below.

Figure 5:
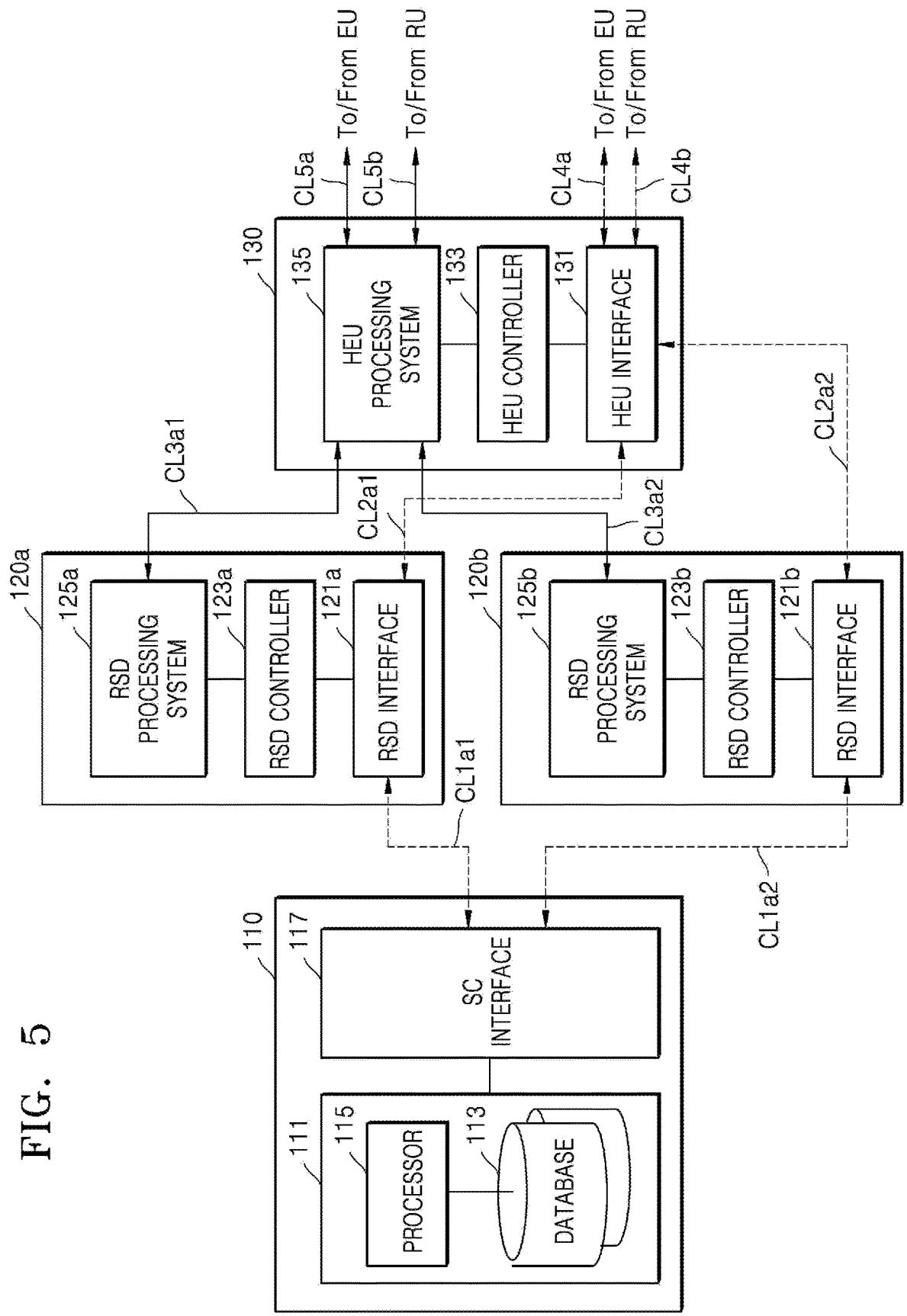
FIG. 5 is a block diagram of a spectrum sharing system according to an example embodiment of the present disclosure.
Figure 6:
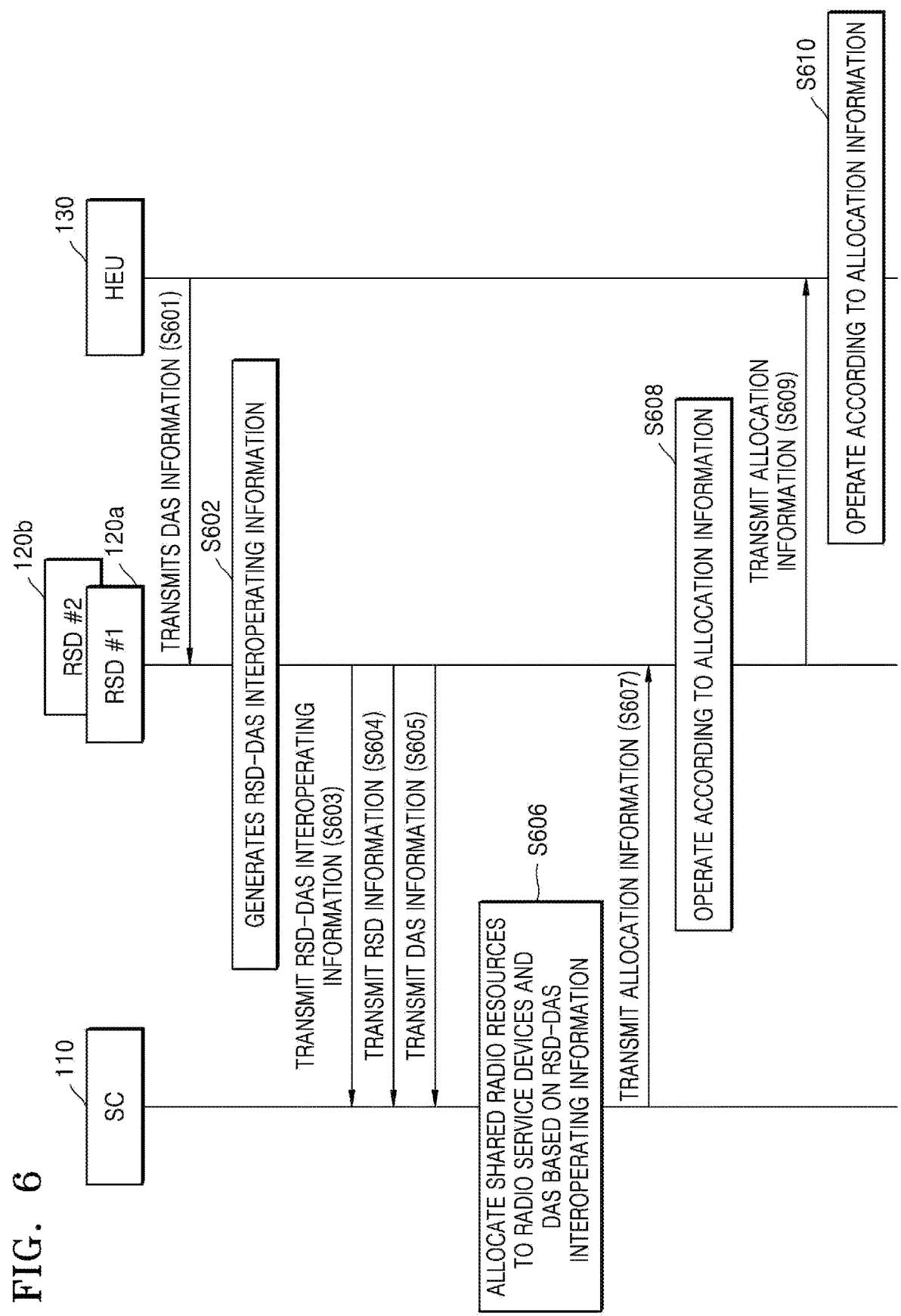
FIG. 6 is an exemplary flowchart for illustrating a method of operating the spectrum sharing system shown in FIG. 5.
Figure 7:
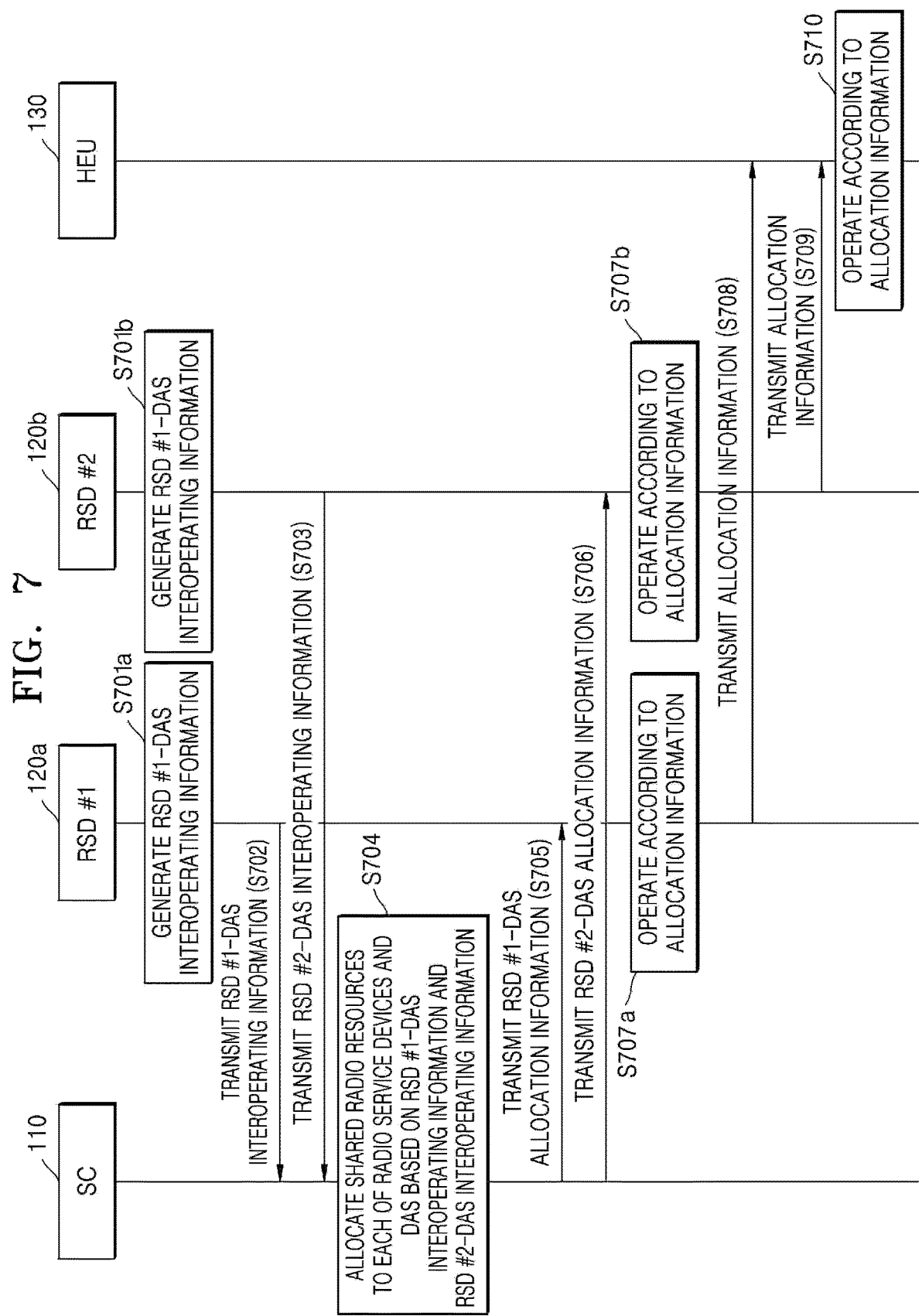
FIG. 7 is an exemplary flowchart for illustrating a method of operating the spectrum sharing system shown in FIG. 5.
Figure 8:
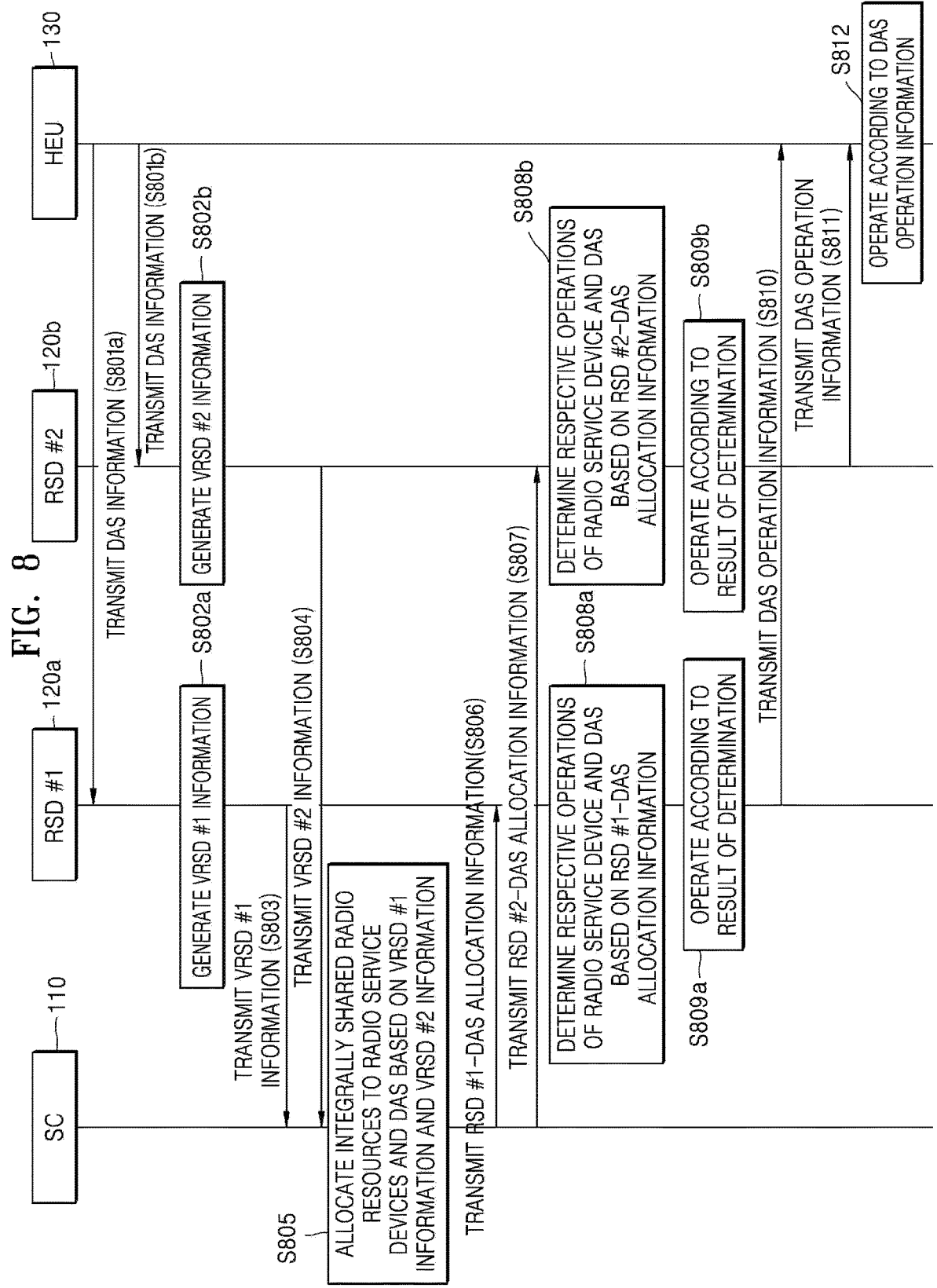
FIG. 8 is an exemplary flowchart for illustrating a method of operating the spectrum sharing system shown in FIG. 5.

FIG. 5 is a block diagram of a spectrum sharing system according to an example embodiment of the present disclosure, and FIGS. 6 to 8 are flowcharts for illustrating a method of operating the spectrum sharing system shown in FIG. 5.

In more detail, the spectrum sharing system shown in FIG. 5 illustrates an embodiment in which the head-end unit 130 of the distributed antenna system DAS interoperates with the plurality of radio service devices 120a and 120b. In this embodiment, the system controller 110 and the plurality of radio service devices 120a and 120b and the plurality of radio service devices 120a and 120b and the head-end unit 130 may be respectively and communicatively connected to each other through respective interfaces to transmit and receive information necessary for spectrum sharing access.

In the description of FIGS. 5 and 8, the same or corresponding reference numerals as those in FIGS. 1 to 2C denote the same or corresponding elements, and therefore, repeated descriptions thereof will not be given herein. In the spectrum sharing system according to the present embodiment, allocation operations of shared radio resources for the distributed antenna system DAS including the system controller 110, the plurality of radio service devices 120a and 120b, and the head-end unit 130 will be mainly described.

First, referring to FIGS. 1 to 2C, 5, and 6, in operation S601, the head-end unit 130 generates information (hereinafter referred to as DAS information) of the distributed antenna system DAS and transmits the DAS information to at least one of the plurality of radio service devices 120a and 120b.

The DAS information, which is information related to a radio service of the plurality of radio service devices 120a and 120b provided to end-user devices through the distributed antenna system DAS, may include, for example, radio access technologies respectively provided from the plurality of radio service devices 120a and 120b to the node units (the head-end unit 130, the remote unit 140, and the expansion unit 150) of the distributed antenna system DAS, operating parameters associated with the radio access technologies, a geographic location, a device identifier, and the like.

Next, in operation S602, any one of the plurality of radio service devices 120a and 120b generates interoperating information (hereinafter referred to as RSD-DAS interoperating information) of the plurality of radio service devices 120a and 120b and the distributed antenna system DAS based on the DAS information received from the head-end unit 130. In this case, the one of the plurality of radio service devices 120a and 120b operates as a domain proxy.

The RSD-DAS interoperating information, which is information directly or indirectly indicating whether or not the plurality of radio service devices 120a and 120b interoperate with the distributed antenna system DAS, may include an indication of an interoperating state, an indication of radio access technologies provided by the plurality of radio service devices 120a and 120b through the distributed antenna system DAS, operating parameters associated with the radio access technologies, a geographic location, a device identifier, and the like.

Since the DAS information includes all information such as the radio access technologies provided by the plurality of radio service devices 120a and 120b, only one of the plurality of radio service devices 120a and 120b may generate the RSD-DAS interoperating information based on the DAS information.

Next, in operation S603, the one of the radio service devices transmits the generated RSD-DAS interoperating information to the system controller 110, in operation S604, transmits its own information (hereinafter referred to as RSD information) to the system controller 110. In operation S605, the one of the radio service devices transmits the DAS information received from the head-end unit 130 to the system controller 110.

That is, the one of the radio service devices transmits, as a domain proxy, other interoperating elements, that is, information about each of the other radio service device and the distributed antenna system DAS, to the system controller 110 together with the RSD-DAS interoperating information indicating whether or not the interoperating is performed.

In operation S606, the system controller 110 allocates the shared radio resources to the plurality of radio service devices 120a and 120b and the distributed antenna system DAS in consideration of the interoperating state based on the received RSD-DAS interoperating information.

In operation S607, the system controller 110 transmits allocation information indicating a result of the allocation to the one of the radio service devices. In operation S608, the one of the radio service devices operates according to the received allocation information.

In operation S609, the one of the radio service devices transmits the allocation information to the head-end unit 130. In operation S610, the head-end unit 130 operates according to the received allocation information.

Meanwhile, although not shown in FIG. 6, the one of the radio service devices transmits the allocation information to an other radio service device in addition to the head-end unit 130 so that the other radio service device also operates according to the received allocation information.

Furthermore, the head-end unit 130 transmits the allocation information received from the other radio service to other elements of the distributed antenna system DAS such as the remote unit 140 and the expansion unit 150 so that the distributed antenna system DAS may operate using the allocated radio resources.

Next, referring to FIGS. 1 to 2C, 5, and 7, in operations S701a and S701b, the plurality of radio service devices 120a and 120b respectively generates interoperating information (hereinafter referred to as RSD #1-DAS interoperating information and RSD #2-DAS interoperating information) with the distributed antenna system DAS based on information (hereinafter referred to as DAS information) of the distributed antenna system DAS received from the head-end unit 130.

Meanwhile, although not shown in FIG. 7, as described above with reference to operation S601 in FIG. 6, the head-end unit 130 may transmit the DAS information (e.g., a location of the head-end unit 130, a location of remote units connected to the head-end unit 130, an output power, a supporting frequency band, etc.) to the plurality of radio service devices 120a and 120b through a network. In another embodiment, the head-end unit 130 may transmit the DAS information to the plurality of radio service devices 120a and 120b in an off-line manner.

The RSD #1-DAS interoperating information, which is information directly or indirectly indicating whether or not the radio service device 120a interoperates with the distributed antenna system DAS, may include an indication of an interoperating state, an indication of radio access technology provided by the radio service device 120a through the distributed antenna system DAS, operating parameters associated with the radio access technology, a geographic location, a device identifier, and the like.

Similarly, the RSD #2-DAS interoperating information, which is information directly or indirectly indicating whether or not the radio service device 120b interoperates with the distributed antenna system DAS, may also include an indication of an interoperating state, an indication of radio access technology provided by the radio service device 120b through the distributed antenna system DAS, operating parameters associated with the radio access technology, a geographic location, a device identifier, and the like.

In operation S702, the radio service device 120a transmits the RSD #1-DAS interoperating information to the system controller 110. In operation S703, the radio service device 120b transmits the RSD #2-DAS interoperating information to the system controller 110.

That is, each of the plurality of radio service devices 120a and 120b transmits information related to interoperation with the distributed antenna system DAS to the system controller 110.

In operation S704, the system controller 110 allocates shared radio resources to each of the plurality of radio service devices 120a and 120b and the distributed antenna system DAS based on the received RSD #1-DAS interoperating information and the RSD #2-DAS interoperating information.

In operation S705, the system controller 110 transmits RSD #1-DAS allocation information indicating a result of allocating radio resources to the radio service device 120a in consideration of interoperating the radio service device 120a and the distributed antenna system DAS. In operation S706, the system controller 110 transmits RSD #2-DAS allocation information indicating a result of allocating radio resources to the radio service device 120b in consideration of interoperating the radio service device 120b and the distributed antenna system DAS.

In operation S707a and S707b, the radio service devices 120a and 120b respectively operate according to the pieces of received allocation information. In operations S708 and S709, the radio service devices 120a and 120b respectively transmit the pieces of allocation information received from the system controller 110 to the head-end unit 130. In operation S710, the head-end unit 130 operates according to the received pieces of allocation information.

Meanwhile, the head-end unit 130 transmits the pieces of allocation information received from the radio service devices 120a and 120b to other elements of the distributed antenna system DAS such as the remote unit 140 and the expansion unit 150 so that the distributed antenna system DAS may operate using the allocated radio resources.

Next, referring to FIGS. 1 to 2C, 5, and 8, in operations S801a and S801b, the head-end unit 130 transmits information of the distributed antenna system DAS (hereinafter referred to as DAS information) to each of the plurality of radio service devices 120a and 120b.

In operations S802a and S802b, the plurality of radio service devices 120a and 120b respectively aggregate their own information and the DAS information to generate virtualized radio service device information (hereinafter referred to as VRSD #1 information and VRSD #2 information).

The VRSD #1 information may be information that identifies the distributed antenna system DAS as a device integrated with the radio service device 120a or as an extension device of the radio service device 120a. For example, the VRSD #1 information may include an indication of radio access technology provided by the radio service device 120a through the distributed antenna system DAS, operating parameters associated with the radio access technology, a geographic location, a device identifier, and the like.

Similarly, the VRSD #2 information may be information that identifies the distributed antenna system DAS as a device integrated with the radio service device 120b or as an extension device of the radio service device 120b. For example, the VRSD #2 information may include an indication of radio access technology provided by the radio service device 120b through the distributed antenna system DAS, operating parameters associated with the radio access technology, a geographic location, a device identifier, and the like.

Thereafter, in operation S803, the radio service device 120a transmits the VRSD #1 information to the system controller 110. In operation S804, the radio service device 120b transmits the VRSD #2 information to the system controller 110.

That is, FIG. 8 discloses an embodiment where the radio service devices 120a and 120b respectively transmit the VRSD #1 information and the VRSD #2 information to the system controller 110 such that the system controller 110 recognizes the distributed antenna system DAS respectively connected to the radio service devices 120a and 120b as an integrated (or extended) device.

In operations S805, the system controller 110, based on the received VRSD #1 information and the VRSD #2 information, allocates integrally shared radio resources to the radio service device 120a and the distributed antenna system DAS (i.e., one virtualized radio service device) and the radio service device 120b and the distributed antenna system DAS (i.e., the other virtualized radio service device).

In operation S806, the system controller 110 transmits the RSD #1-DAS allocation information indicating a result of allocating radio resources to the one virtualized radio service device to the radio service devices 120a. In operation S807, the system controller 110 transmits the RSD #2-DAS allocation information indicating a result of allocating radio resources to the other virtualized radio service device to the radio service devices 120b.

In operation S808a, the radio service device 120a determines respective operations of the radio service device 120a and the distributed antenna system DAS based on the received RSD #1-DAS allocation information. In operation S808b, the radio service device 120b determines respective operations of the radio service device 120b and the distributed antenna system DAS based on the received RSD #2-DAS allocation information.

In operation S809a, the radio service device 120a operates according to a result of the determination. In operation S809b, the radio service device 120b operates according to a result of the determination.

In operations S810 and S811, each of the radio service devices 120a and 120b transmits information (hereinafter referred to as DAS operation information) related to the operation determined for the distributed antenna system DAS to the head-end unit 130. In operation S812, the head-end unit 130 operates according to the DAS operation information.

Meanwhile, the head-end unit 130 transmits DAS operation information to other elements of the distributed antenna system DAS such as the remote unit 140 and the expansion unit 150 so that the distributed antenna system DAS may operate using the allocated radio resources.

Figure 9:
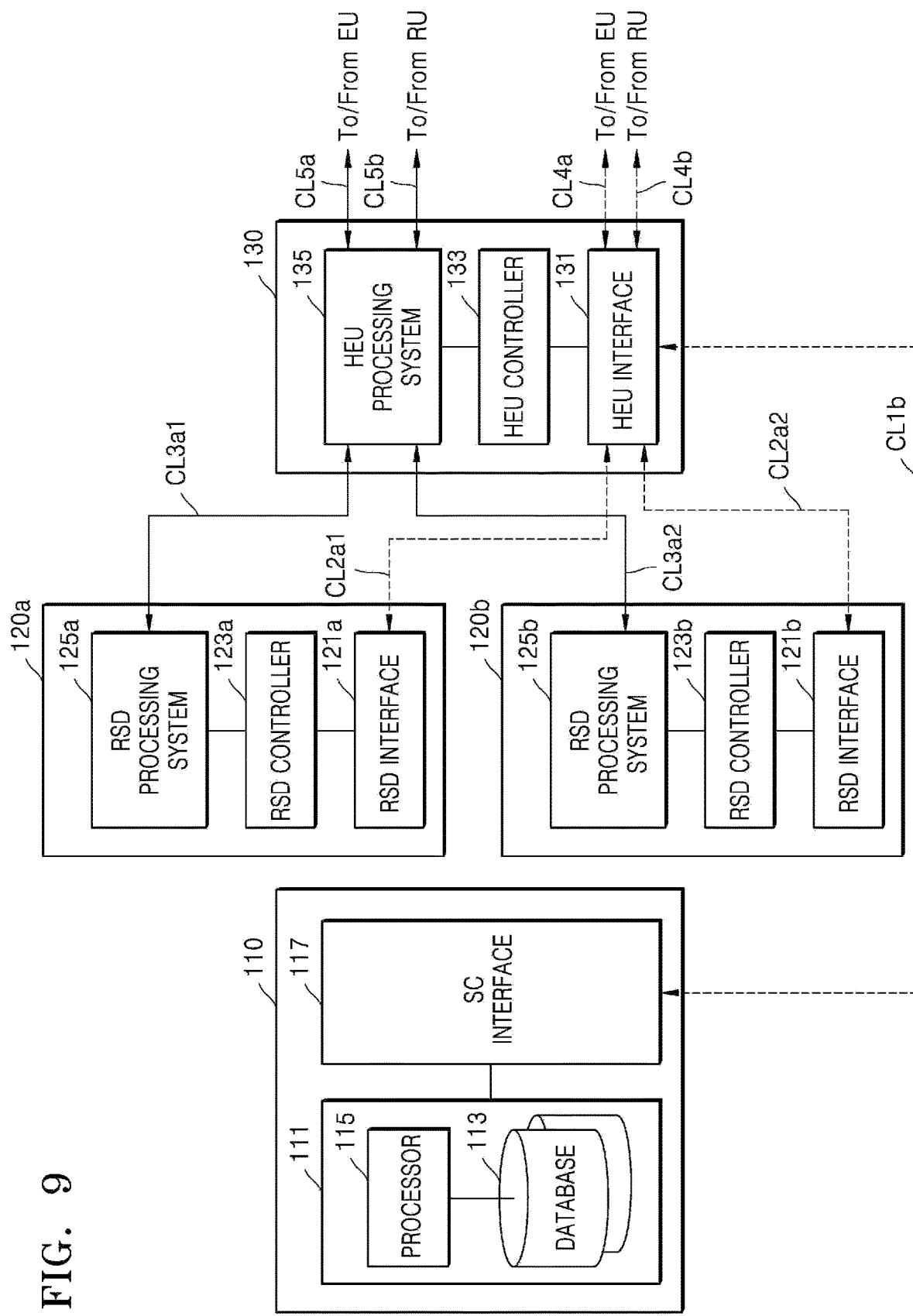
FIG. 9 is a block diagram of a spectrum sharing system according to an example embodiment of the present disclosure.
Figure 10:
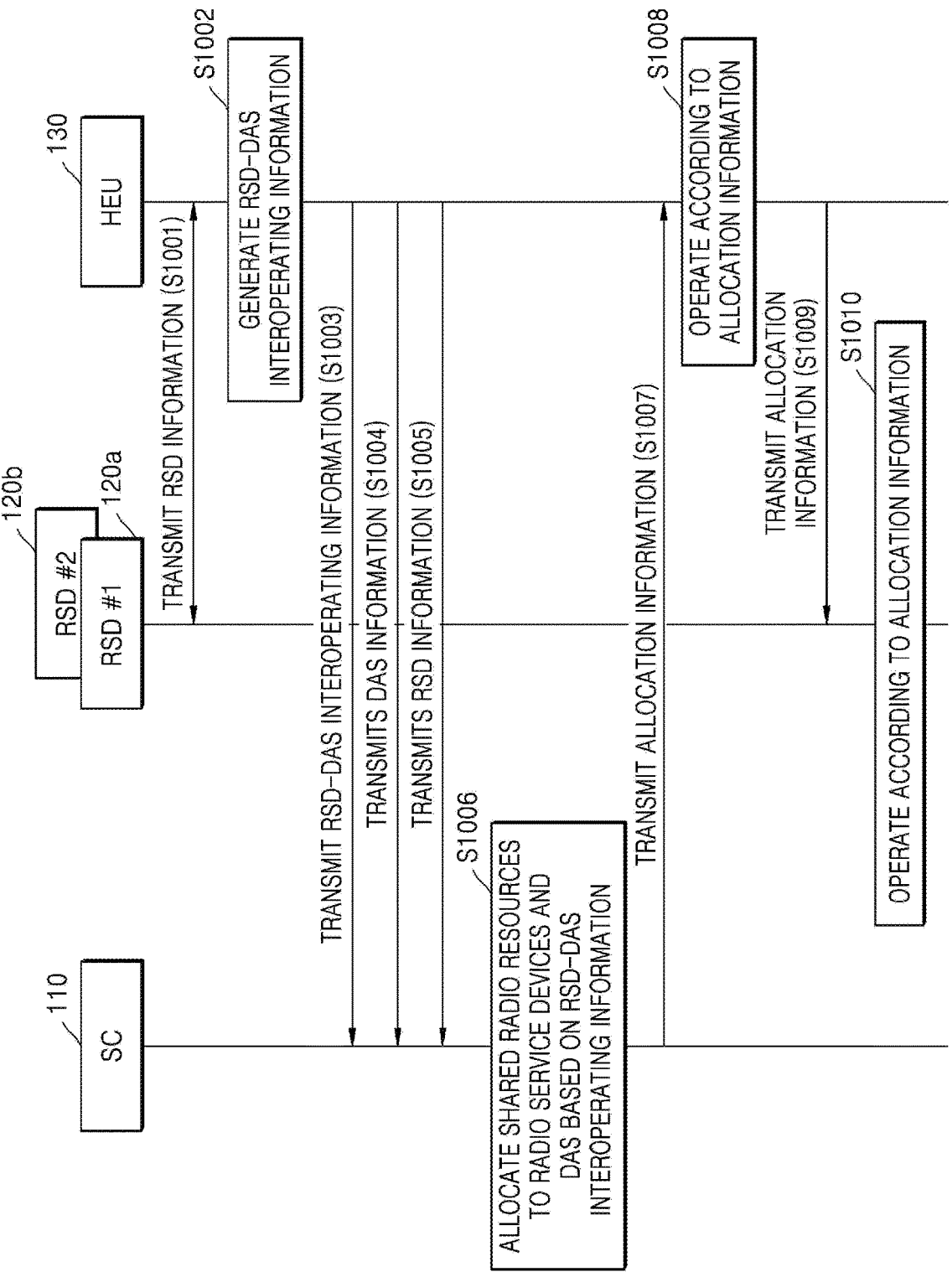
FIG. 10 is an exemplary flowchart for illustrating a method of operating the spectrum sharing system shown in FIG. 9.
Figure 11:
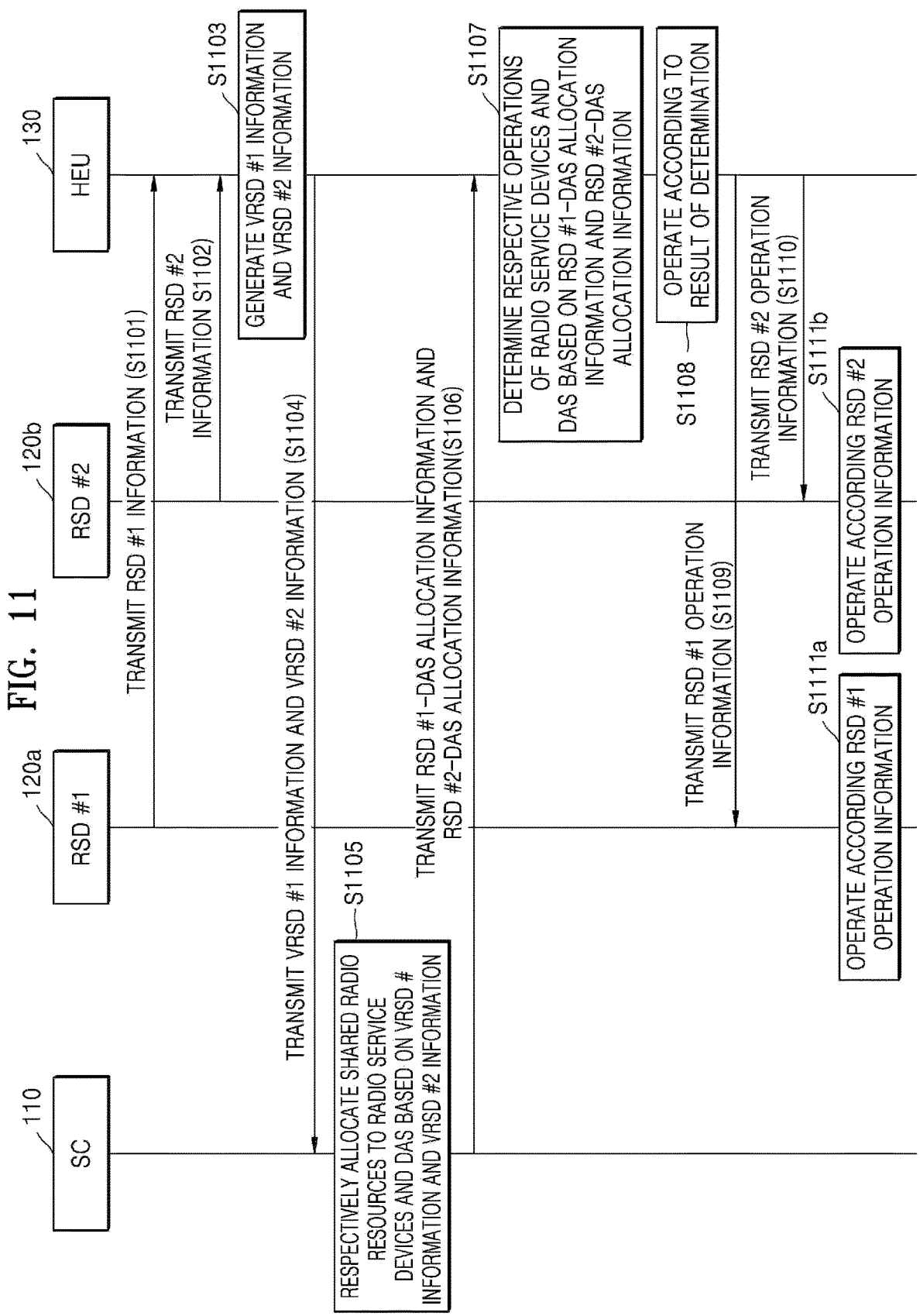
FIG. 11 is an exemplary flowchart for illustrating a method of operating the spectrum sharing system shown in FIG. 9.

FIG. 9 is a block diagram of a spectrum sharing system according to an example embodiment of the present disclosure, and FIGS. 10 and 11 are flowcharts for illustrating a method of operating the spectrum sharing system shown in FIG. 9.

In more detail, the spectrum sharing system shown in FIG. 9 illustrates an embodiment in which the head-end unit 130 of the distributed antenna system DAS interoperates with the plurality of radio service devices 120a and 120b. In this embodiment, the system controller 110 and the head-end unit 130 and the plurality of radio service devices 120a and 120b and the head-end unit 130 may be respectively and communicatively connected to each other through respective interfaces to transmit and receive information necessary for spectrum sharing access.

In the description of FIGS. 9 to 11, the same or corresponding reference numerals as those in FIGS. 1 to 2C denote the same or corresponding elements, and therefore, repeated descriptions thereof will not be given herein. In the spectrum sharing system according to the present embodiment, allocation operations of shared radio resources for the distributed antenna system DAS including the system controller 110, the plurality of radio service devices 120a and 120b, and the head-end unit 130 will be mainly described.

First, referring to FIGS. 1 to 2C, 9, and 10, in operation S1001, the radio service devices 120a and 120b respectively generate their own information (hereinafter referred to as RSD information) and transmit the RSD information to a plurality of head-end units 130.

The RSD information may include, for example, an indication of radio access technologies respectively provided by the radio service devices 120a and 120b, operating parameters associated with the radio access technologies, a geographic location, a device identifier, and the like.

Next, in operation S1002, the head-end unit 130 generates interoperating information (hereinafter referred to as RSD-DAS interoperating information) of the plurality of radio service devices 120a and 120b and the distributed antenna system DAS based on the RSD information respectively received from the plurality of radio service devices 120a and 120b.

Thereafter, in operation S1003, the head-end unit 130 transmits the RSD-DAS interoperating information to the system controller 110. In operation S1004, the head-end unit 130 transmits its own information (hereinafter referred to as DAS information) to the system controller 110. In operation S1005, the head-end unit 130 transmits the RSD information received from the radio service devices 120a and 120b to the system controller 110.

That is, the head-end unit 130 transmits, as a domain proxy, other interoperating elements, that is, respective information about the radio service devices 120a and 120b and the distributed antenna system DAS, to the system controller 110 together with the RSD-DAS interoperating information indicating whether or not the interoperating is performed.

In operation S1006, the system controller 110 allocates the shared radio resources to the plurality of radio service devices 120a and 120b and the distributed antenna system DAS in consideration of the interoperating state based on the received RSD-DAS interoperating information.

In operation S1007, the system controller 110 transmits allocation information indicating a result of the allocation to the head-end unit 130, and in operation S1008, the head-end unit 130 operates according to the received allocation information.

Meanwhile, although not shown in FIG. 9, the head-end unit 130 transmits the allocation information received from the system controller 110 to other elements of the distributed antenna system DAS such as the remote unit 140 and the expansion unit 150 so that the distributed antenna system DAS may operate using the allocated radio resources.

In operation S1009, the head-end unit 130 transmits the allocation information to the radio service devices 120a and 120b, and in operation S1010, each of the radio service devices 120a and 120b operates according to the received allocation information.

Next, referring to FIGS. 1 to 2C, 9, and 11, in operation S1101, the radio service device 120a transmits its own information (hereinafter referred to as RSD #1 information) to the head-end unit 130, in operation S1102, the radio service device 120b transmits its own information (hereinafter referred to as RSD #2 information) to the head-end unit 130, and in operation S1103, the head-end unit 130 combines respective information of the distributed antenna system DAS and the radio service devices 120a and 120b to generate virtualized radio service device information (hereinafter referred to as VRSD #1 information and VRSD #2 information).

The VRSD #1 information may be information that identifies the distributed antenna system DAS as a device integrated with the radio service device 120a or as an extension device of the radio service device 120a. For example, the VRSD #1 information may include radio access technology provided by the radio service device 120a through the distributed antenna system DAS, operating parameters associated with the radio access technology, a geographic location, a device identifier, and the like.

Similarly, the VRSD #2 information may be information that identifies the distributed antenna system DAS as a device integrated with the radio service device 120b or as an extension device of the radio service device 120b. For example, the VRSD #2 information may include radio access technology provided by the radio service device 120b through the distributed antenna system DAS, operating parameters associated with the radio access technology, a geographic location, a device identifier, and the like.

In operation S1104, the head-end unit 130 transmits the VRSD #1 information and the VRSD #2 information to the system controller 110.

That is The head-end unit 130 transmits the VRSD #1 information and the VRSD #2 information to the system controller 110 such that the distributed antenna system DAS operates integrally with each of the plurality of radio service devices 120a and 120b and the system controller 110 recognizes the distributed antenna system DAS as a device integrated (or extended) with each of the plurality of radio service devices 120a and 120b.

In operations S1105, the system controller 110, based on the received VRSD #1 information and the VRSD #2 information, allocates shared radio resources to the radio service device 120a and the distributed antenna system DAS (i.e., one virtualized radio service device) and the radio service device 120b and the distributed antenna system DAS (i.e., the other virtualized radio service device), respectively.

In operation S1106, the system controller 110 transmits the RSD #1-DAS allocation information indicating a result of allocating radio resources to the one virtualized radio service device and the RSD #2-DAS allocation information indicating a result of allocating radio resources to the other virtualized radio service device to the head-end unit 130, respectively.

In operation S1107, the head-end unit 130 determines respective operations of the radio service device 120a, the radio service device 120b, and the distributed antenna system DAS based on the received RSD #1-DAS allocation information and the RSD #2-DAS allocation information.

In operation S1108, the head-end unit 130 operates according to a result of the determination of the distributed antenna system DAS.

Meanwhile, the head-end unit 130 transmits pieces of Information related to the determined result to other elements of the distributed antenna system DAS such as the remote unit 140 and the expansion unit 150 so that the distributed antenna system DAS may operate using the allocated radio resources.

In operation S1109, the head-end unit 130 transmits information (RSD #1 operation information) related to the operation determined for the radio service device 120a to the radio service device 120a, and in operation S1110, the head-end unit 130 transmits information (RSD #2 operation information) related to the operation determined for the radio service device 120b to the radio service device 120b. Accordingly, in operations S1111a and S1111b, each of the radio service devices 120b and 120b operates according to the received operation information.

FIGS. 3 to 11 describe the embodiment in which the head-end unit 130 interoperates with the plurality of radio service devices 120a and 120b above. However, even in an embodiment in which the remote unit 130 interoperates with at least one radio service device, the allocation operation of the shared radio resources as shown in FIGS. 3 to 11 will be possible.

Further, FIGS. 4, 6 to 8, 10, and 11 and the methods described with reference thereto include one or more operations and/or actions for achieving the methods. The operations and/or actions for achieving the methods may be interchanged with one another without departing from the scope of the claims. In other words, the order and/or use of specific operations and/or actions may be modified without departing from the scope of the claims, unless a certain order for the operations and/or actions is specified.

An example of a spectrum sharing system of the present disclosure is a Citizens Broadband Radio Service (CBRS) system specified by the United States Federal Communications Commission (FCC). For convenience of description, technologies proposed in the present disclosure have sometimes been described on the premise of the CBRS system. However, such a description does not limit the technologies proposed in the present disclosure. For example, the present disclosure is applicable to various spectrum sharing systems other than the CBRS system.

In addition, various operations of the methods described above may be performed by any suitable means capable of performing corresponding functions. The means includes, but is not limited to, various hardware and/or software components and/or modules such as an application specific integrated circuit (ASIC) or a processor. In general, when there are operations corresponding to the drawings, these operations may have a corresponding counterpart and functional components having the same number as the number of the counterpart.

The various illustrative logic blocks, components, or circuits described in connection with the present disclosure may be implemented or performed by a general-purpose processor designed to perform the functions disclosed herein, a digital signal processor (DSP), an ASIC, a field-programmable gate array (FPGA) or other programmable logic device (PLD), a discrete gate or transistor logic device, discrete hardware components, or any combination thereof. The general-purpose processor may be a microprocessor, but may alternatively be any commercially available processor, controller, microcontroller, or state machine. The processor may also be implemented in a combination of computing devices, for example, a combination of the DSP and the microprocessor, a plurality of microprocessors, one or more microprocessors in connection with a DSP core, or any other configuration.

According to example embodiments of the present disclosure, a spectrum sharing system may allocate and operate shared radio resources considering interoperating of the distributed antenna system DAS, thereby preventing unexpected interference from occurring at a specific area and/or at a specific time due to interoperating of the distributed antenna system DAS, and efficiently utilizing the shared radio resources.

Effects obtainable by the method of operating the spectrum sharing system according to the inventive concept are not limited to the effects described above, but other effects not described herein may be clearly understood by those of ordinary skilled in the art from the above descriptions.

Numerous modifications and adaptations will be readily apparent to one of ordinary skill in the art without departing from the spirit and scope of the disclosure.

In this regard, the present embodiments may have different forms and should not be construed as being limited to the descriptions set forth herein.

While the disclosure has been particularly shown and described with reference to embodiments thereof, it will be understood that various changes in form and details may be made therein without departing from the scope of the following claims.

What is claimed is:

1. A method of allocating shared radio resources in a spectrum shared system (SSS), the method comprising:
    obtaining, by a system controller of the SSS, interoperating information capable of integrating radio services of at least one radio service device of the SSS, wherein the interoperating information indicates whether the at least one radio service device is interoperating with a node unit of a distributed antenna system (DAS), and the at least one radio service device is used as a signal source of the DAS when interoperating with the node unit; and
    allocating, by the system controller of the SSS, the shared radio resources to the at least one radio service device and the DAS based on the interoperating information.

2. The method of claim 1, wherein the interoperating information comprises information about at least two of an interoperating state of the at least one radio service device and the DAS, an indication of radio access technology (RAT) provided by the at least one radio service device through the DAS, operation parameters associated with the RAT, and a geographic location.

3. The method of claim 1, wherein the allocating of the shared radio resources comprises allocating, by the system controller of the SSS, the shared radio resources to the at least one radio service device and the DAS, respectively, based on the interoperating information.

4. The method of claim 3, further comprising:
    controlling, by the at least one radio service device, use of the shared radio resources of the DAS by transmitting a result of the allocating to the DAS to the node unit, after the allocating of the shared radio resources.

5. The method of claim 1, wherein the interoperating information comprises information about at least two of an interoperating state of the at least one radio service device and the DAS, an indication of an RAT of the at least one radio service device supported by the node unit, operation parameters associated with the RAT, and a geographic location.

6. The method of claim 5, wherein the allocating of the shared radio resources comprises allocating, by the system controller of the SSS, the shared radio resources to the at least one radio service device and the DAS, respectively, based on the interoperating information.

7. The method of claim 6, further comprising:
    controlling, by the node unit, use of the shared radio resources of the at least one radio service device by transmitting a result of the allocating to the at least one radio service device to the at least one radio service device, after the allocating of the shared radio resources.

* * * * *